United States Patent
Lee et al.

(10) Patent No.: US 10,182,326 B2
(45) Date of Patent: Jan. 15, 2019

(54) METHOD AND DEVICE FOR CONTROLLING DEVICE USING BLUETOOTH TECHNOLOGY

(71) Applicant: LG ELECTRONICS INC., Seoul (KR)

(72) Inventors: Minsoo Lee, Seoul (KR); Hyunsik Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/546,985

(22) PCT Filed: Jan. 26, 2016

(86) PCT No.: PCT/KR2016/000813
§ 371 (c)(1),
(2) Date: Jul. 27, 2017

(87) PCT Pub. No.: WO2016/122186
PCT Pub. Date: Aug. 4, 2016

(65) Prior Publication Data
US 2018/0007499 A1    Jan. 4, 2018

Related U.S. Application Data

(60) Provisional application No. 62/108,500, filed on Jan. 27, 2015.

(51) Int. Cl.
*H04W 4/80* (2018.01)
*H04W 76/10* (2018.01)
*H04W 4/00* (2018.01)
*H04W 76/14* (2018.01)
*H04W 8/00* (2009.01)

(52) U.S. Cl.
CPC ............... *H04W 4/80* (2018.02); *H04W 4/00* (2013.01); *H04W 8/005* (2013.01); *H04W 76/10* (2018.02); *H04W 76/14* (2018.02)

(58) Field of Classification Search
CPC .................................................... H04W 76/10
See application file for complete search history.

(56) References Cited

U.S. PATENT DOCUMENTS

| | | | |
|---|---|---|---|
| 2003/0114205 A1* | 6/2003 | Yamashita | H04W 88/02 455/574 |
| 2006/0135065 A1 | 6/2006 | Lee et al. | |
| 2007/0150539 A1* | 6/2007 | O'Sullivan | G06F 17/30017 709/204 |

(Continued)

FOREIGN PATENT DOCUMENTS

WO    WO 2014/088230 A1    6/2014

*Primary Examiner* — Hsin-Chun Liao
(74) *Attorney, Agent, or Firm* — Birch, Stewart, Kolasch & Birch, LLP

(57) ABSTRACT

The present invention relates to a method and apparatus for controlling a connection between a first device and a second device by using a Bluetooth LE (Low Energy) or a Bluetooth BR/EDR. According to the present invention, the control device transmits first control information for changing the mode of the device to at least one of the first device and the second device, and connects the first device to the second device The second device can control the connection between the first device and the second device.

15 Claims, 38 Drawing Sheets

(56) References Cited

U.S. PATENT DOCUMENTS

| | | | |
|---|---|---|---|
| 2012/0019379 A1* | 1/2012 | Ben Ayed | G08B 13/1436 |
| | | | 340/539.1 |
| 2012/0052802 A1 | 3/2012 | Kasslin et al. | |
| 2012/0195387 A1 | 8/2012 | Masuda | |
| 2014/0169599 A1 | 6/2014 | Solum et al. | |
| 2014/0355582 A1* | 12/2014 | Kamath | H04W 84/20 |
| | | | 370/338 |

* cited by examiner

[Fig.1]
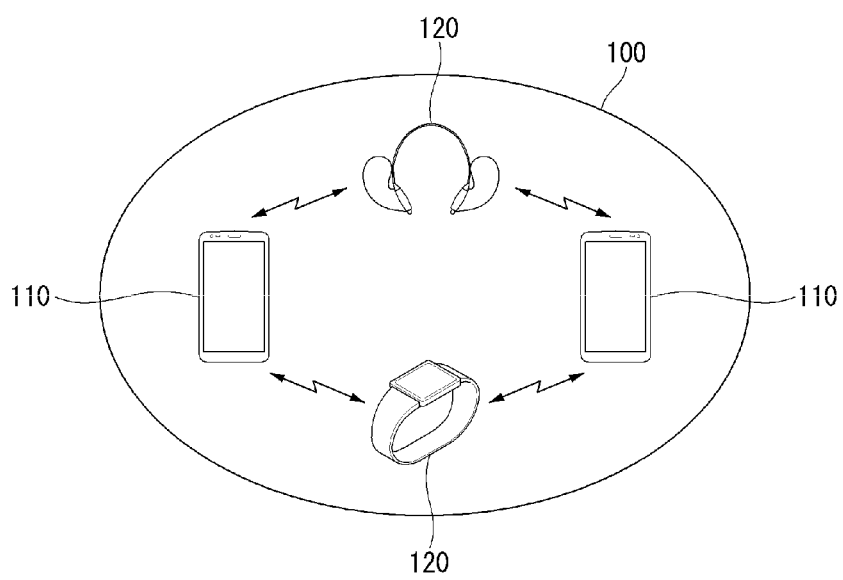

[Fig.2]
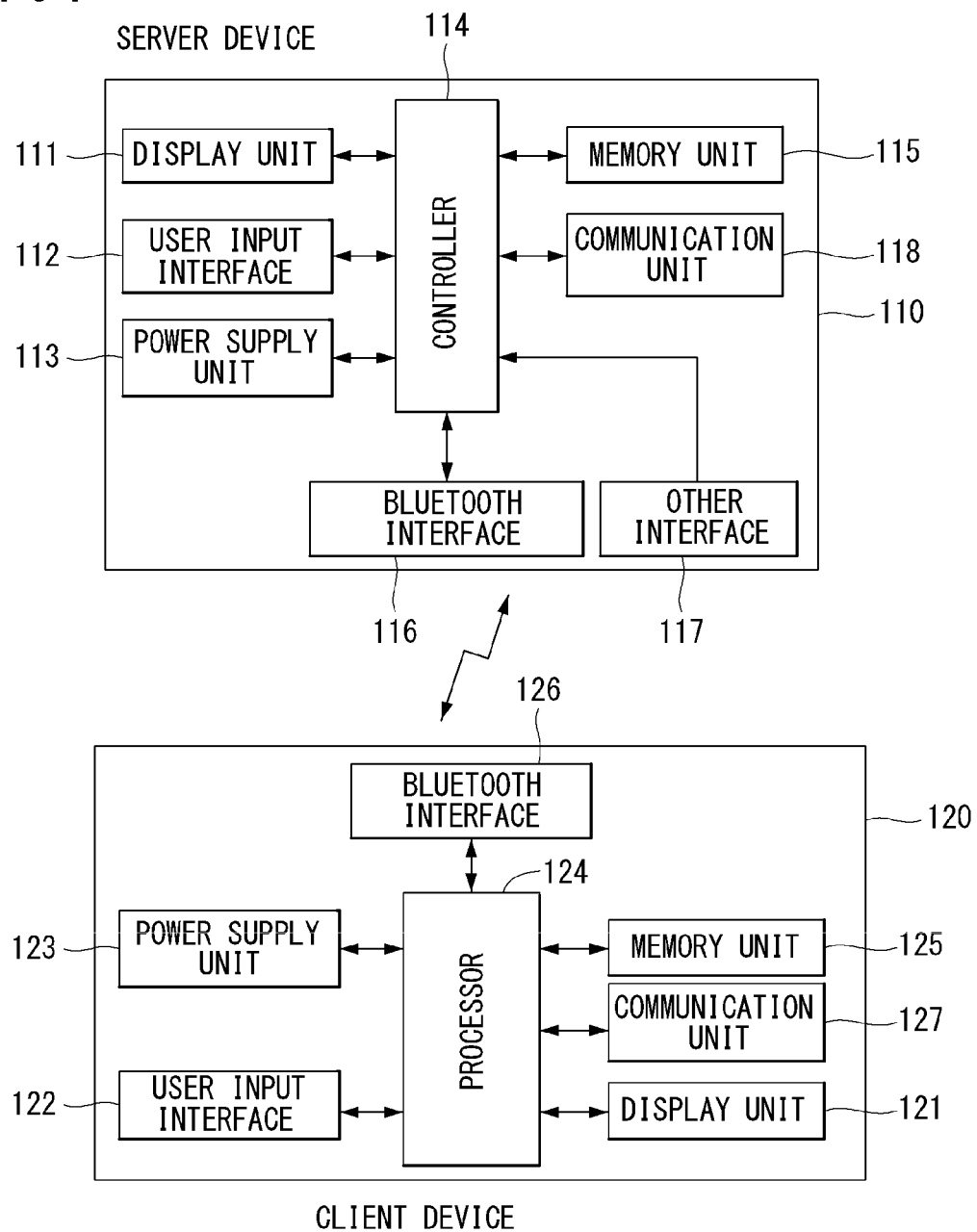

[Fig.3]
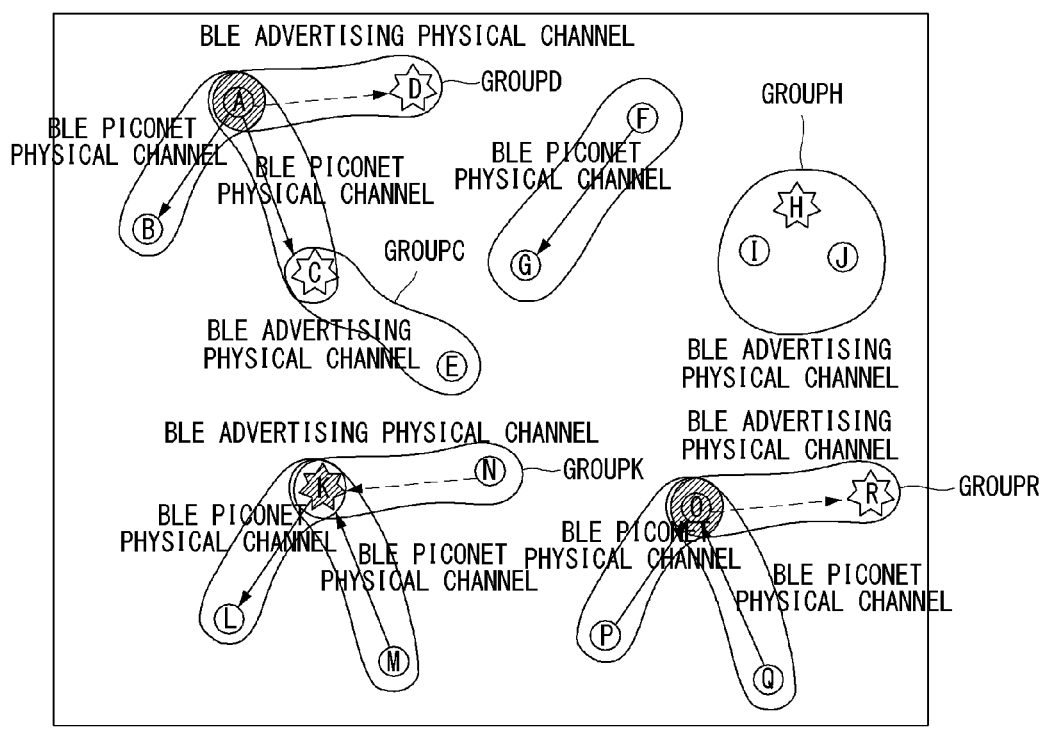

[Fig.4]
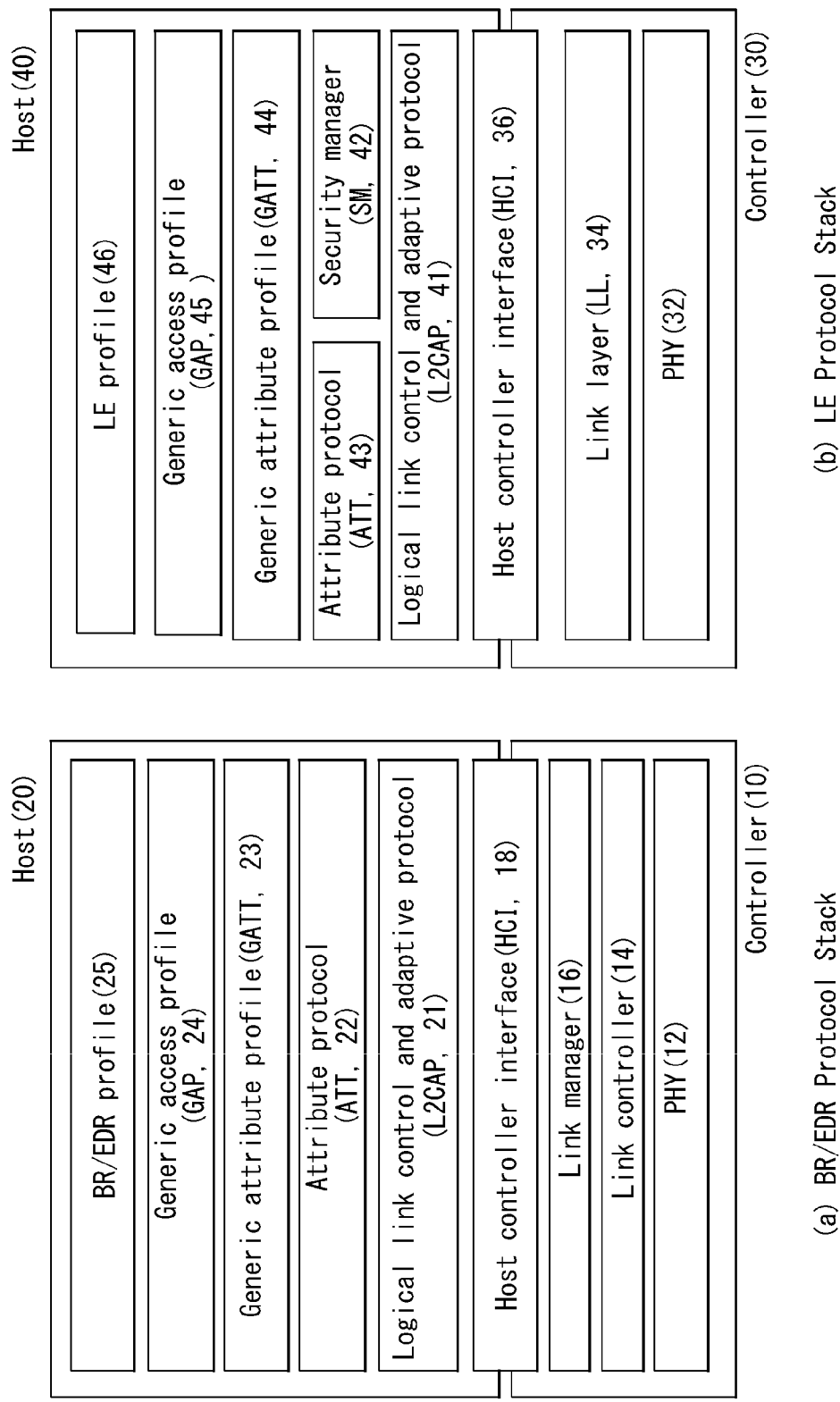

[Fig.5]
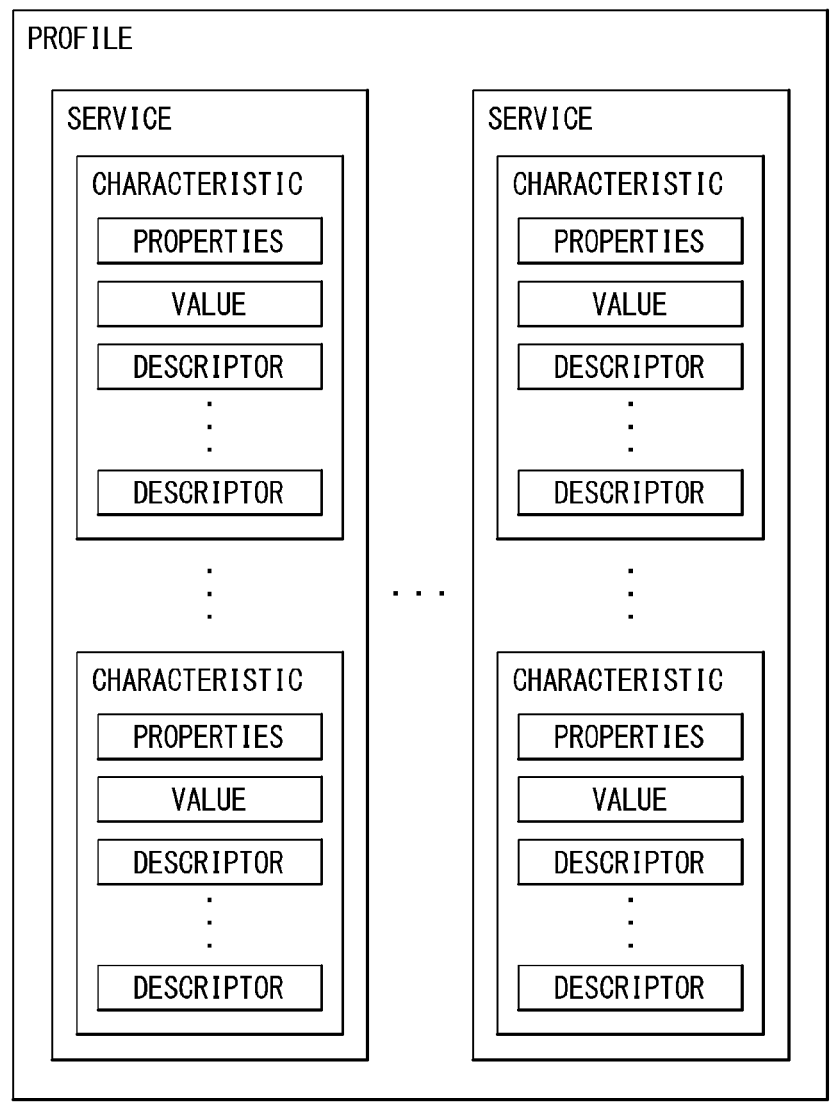

[Fig.6]
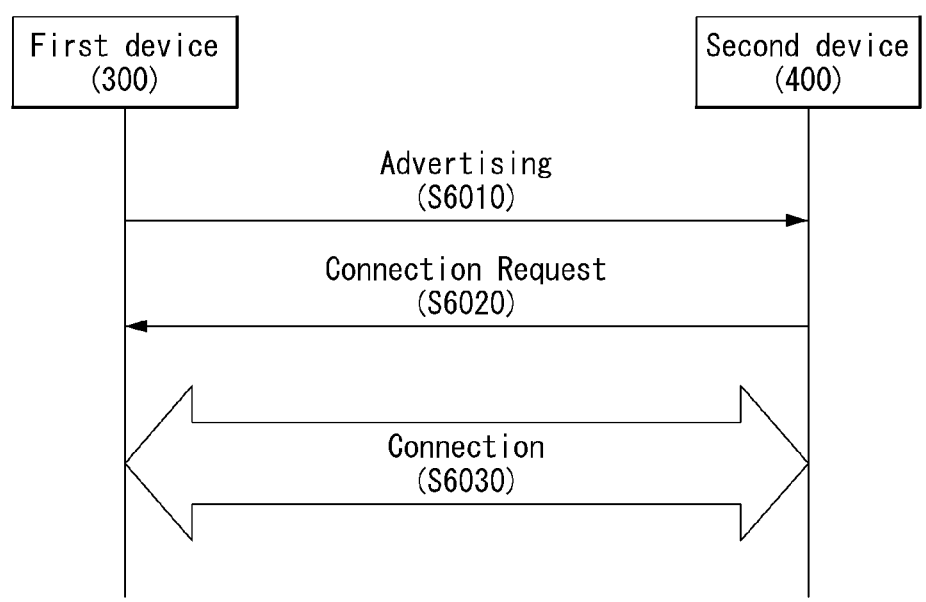

[Fig.7]
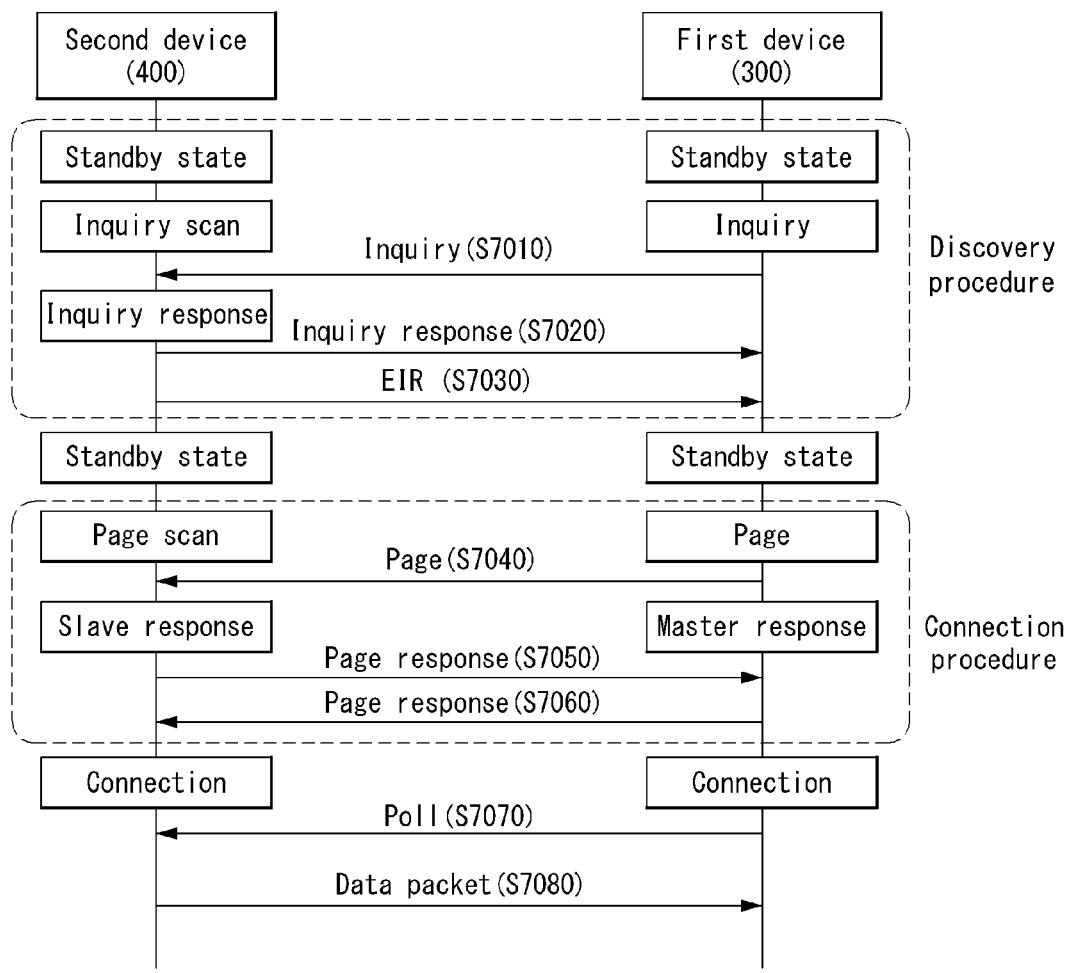

[Fig.8]
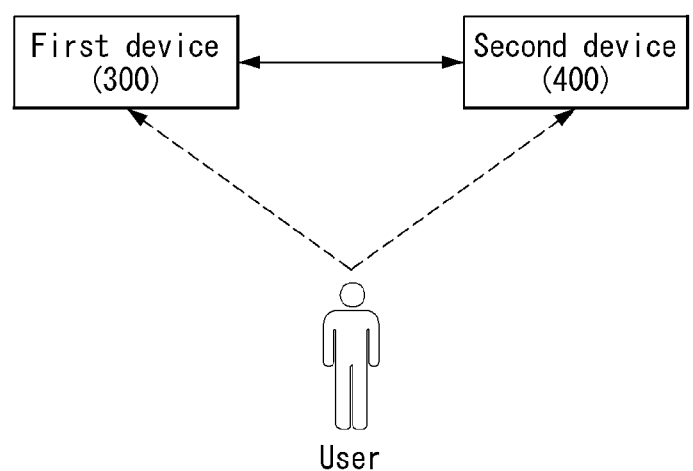

[Fig.9]
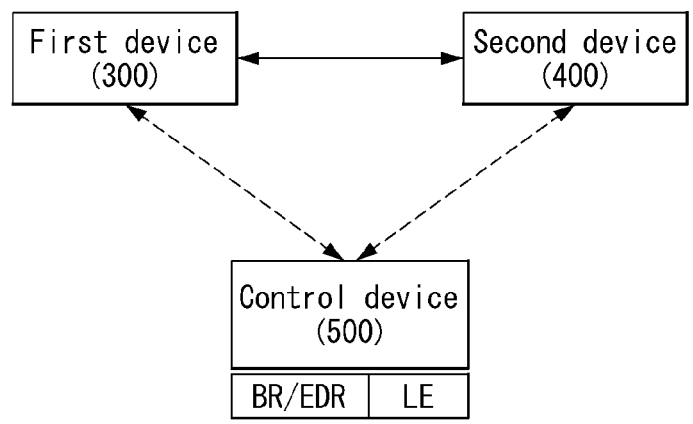

[Fig.10]
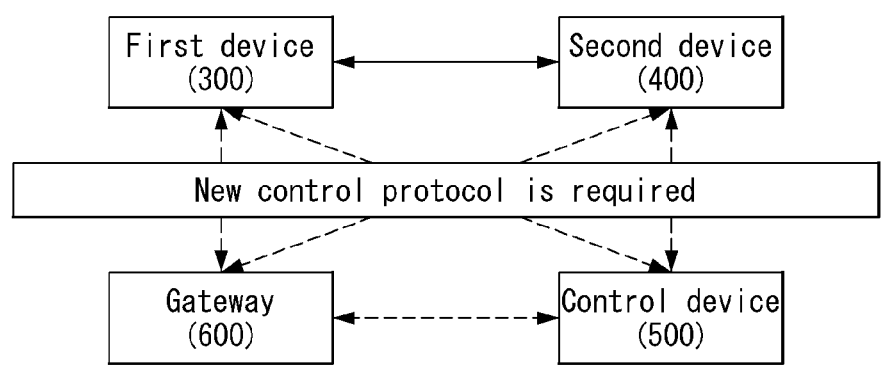

[Fig.11]
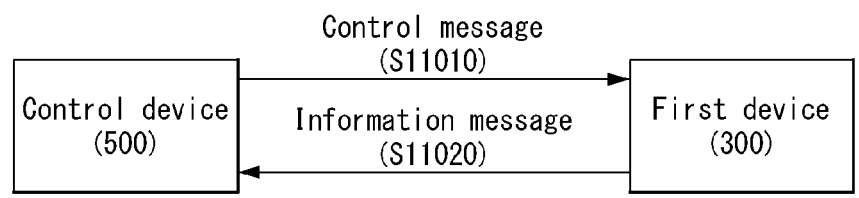

[Fig.12]

| Field | Values |
|---|---|
| Control Type | Type of requested control<br>-Profile Role Change<br>-Discoverability Mode Change<br>-Connection Mode Change<br>-Security Mode Change |
| Control Value | - Role Change : Master /Slave/Broadcaster/ Observer/ Peripheral/ Central<br>-Discoverability Mode Change : Nondiscoverable mode /Discoverable mode /Limited discoverable mode / General discoverable mode /<br>- Connection Mode Change<br>- Security Mode Change |

Control message

[Fig.13]

| Field | Values |
|---|---|
| Security information | Supported I/O<br>Security requirement of Device<br>(Authentication, Encryption, Authorization) |
| GAP Role | · Master/Slave<br>· Broadcaster<br>· Observer<br>· Peripheral<br>· Central |
| Connection/Pairing Status | Connected, Disconnected, Paired, Not-Paired |

Information message

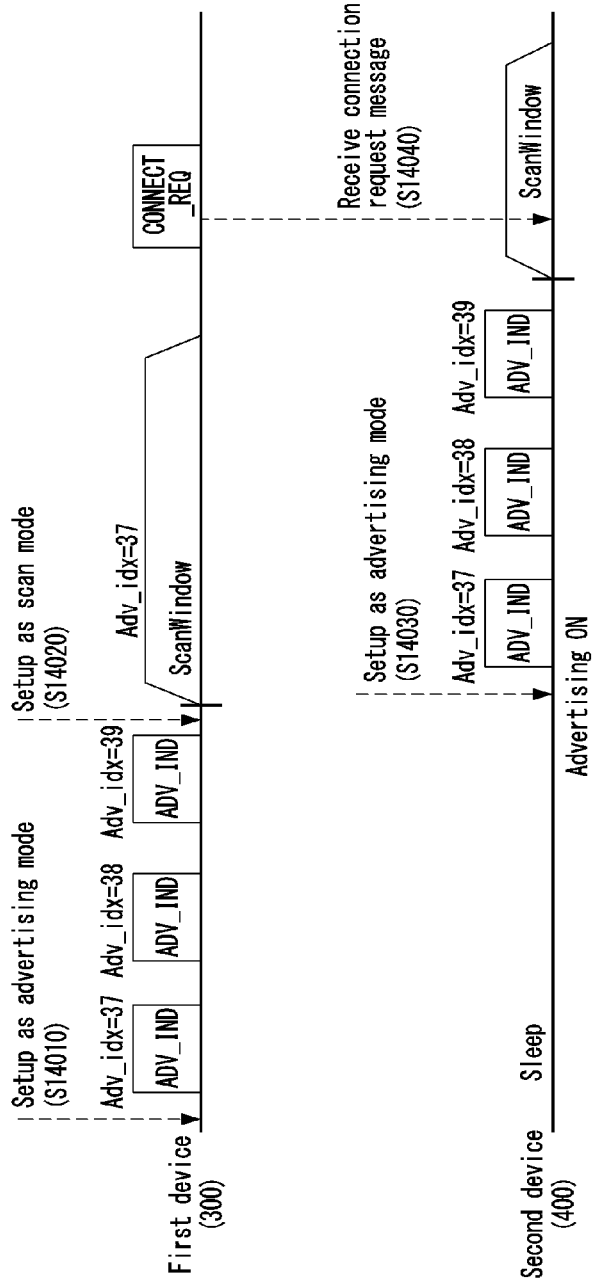
[Fig.14]

[Fig.15]
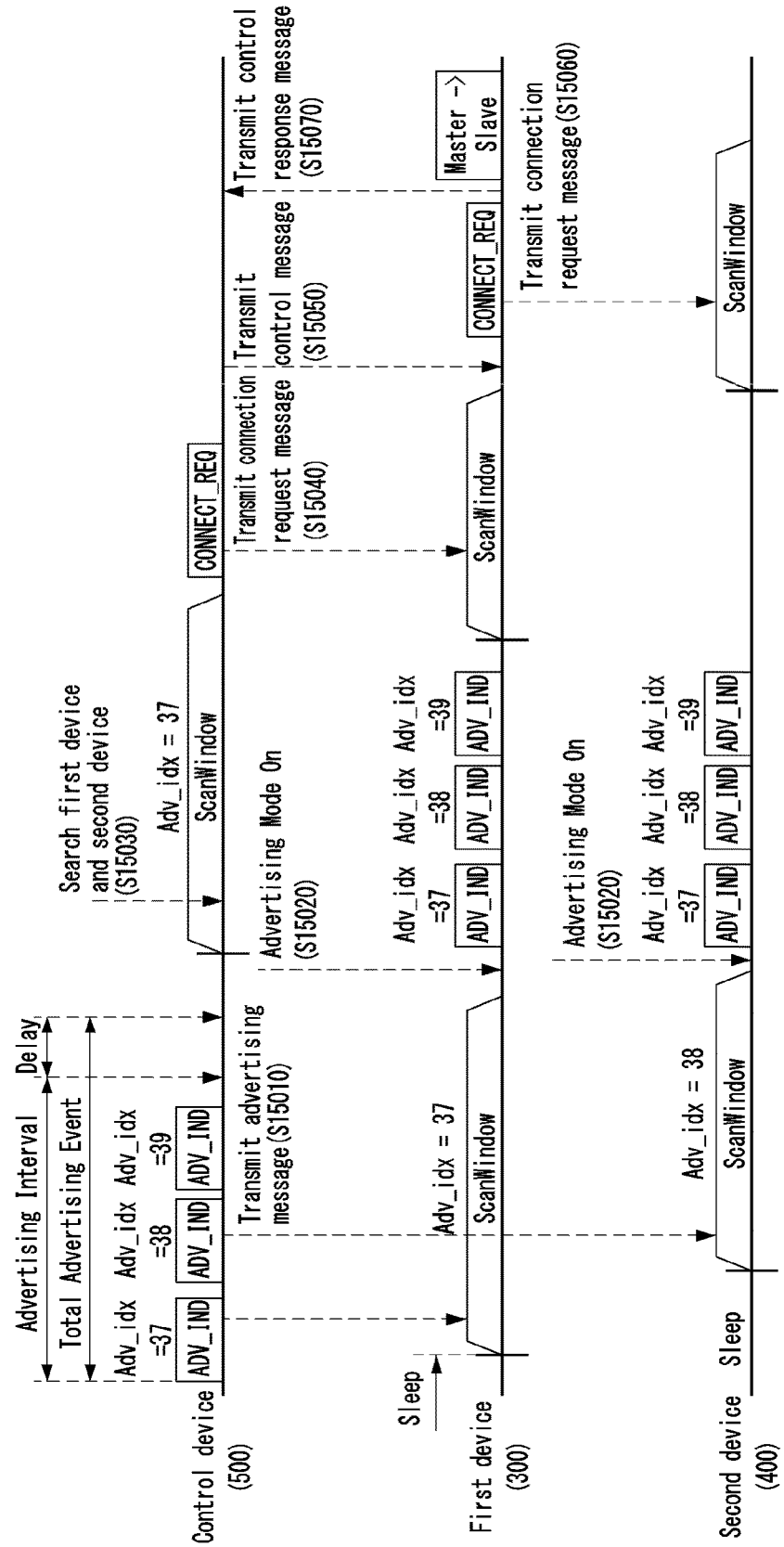

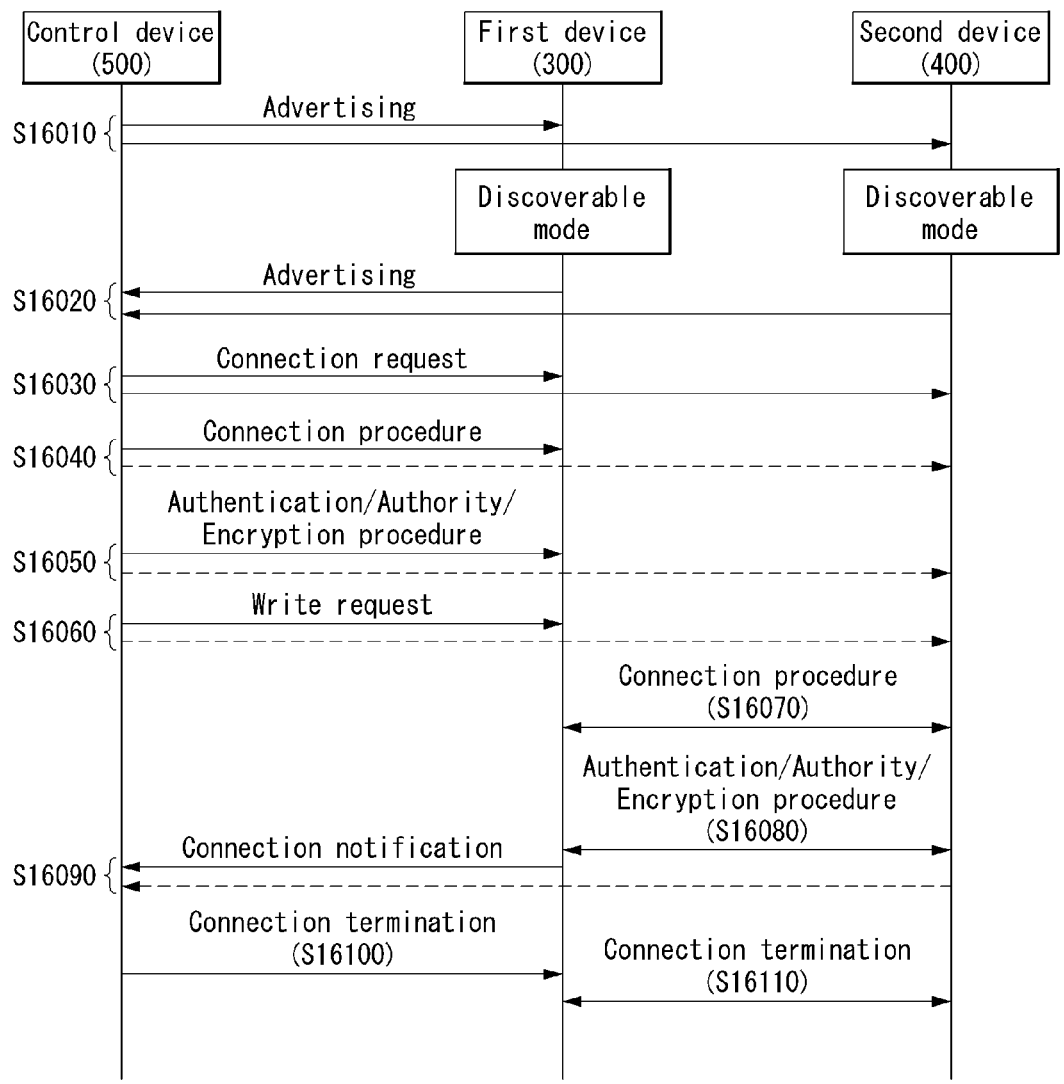

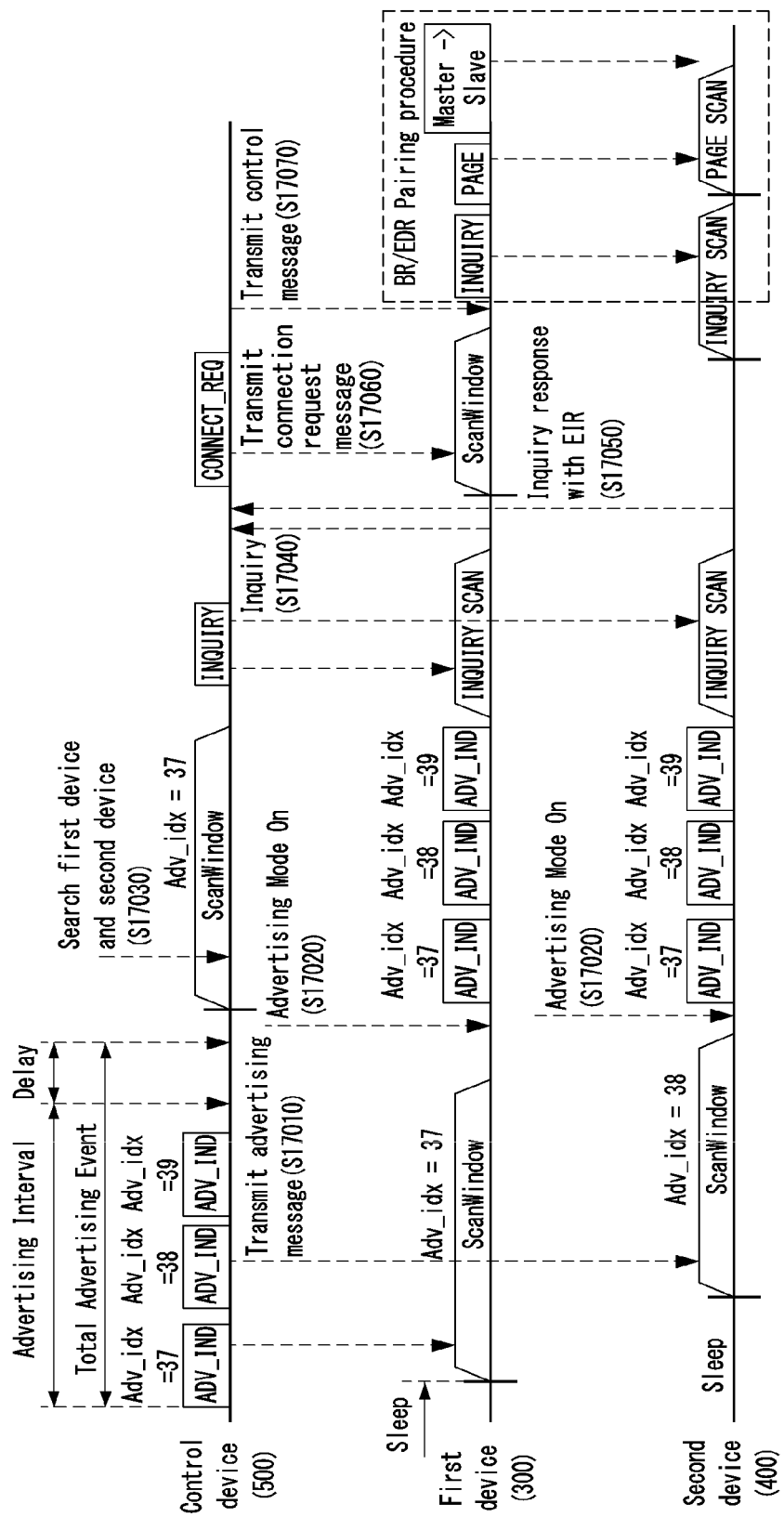
[Fig.17]

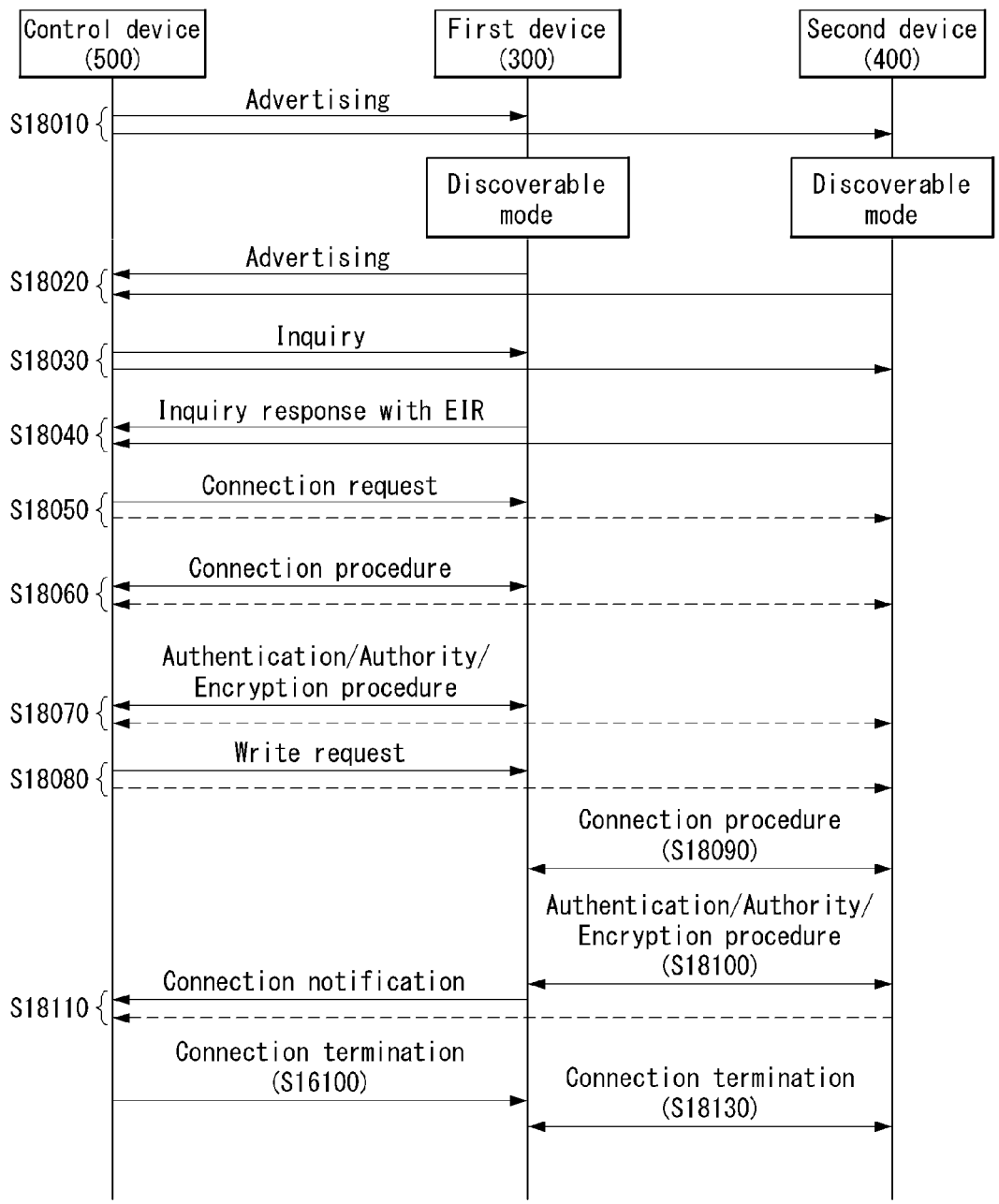

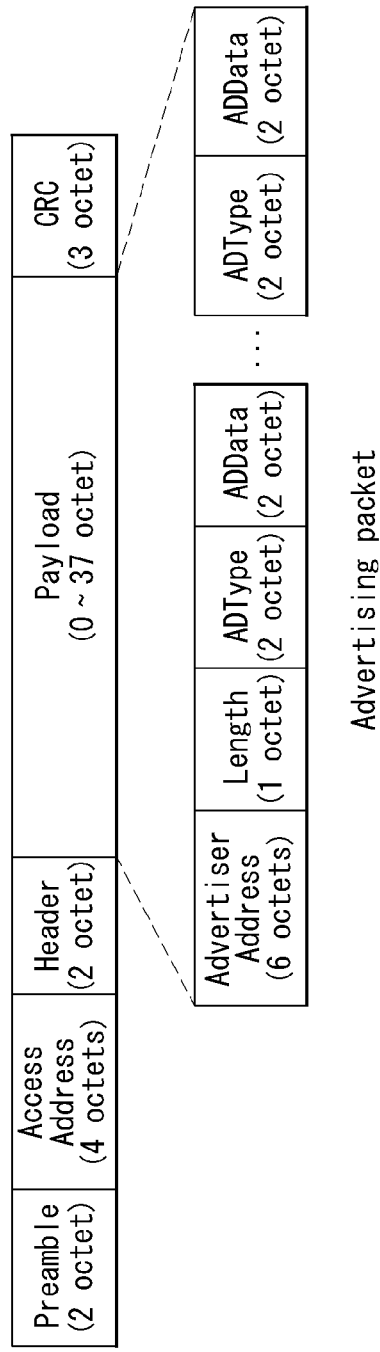
[Fig.19]

[Fig.20]
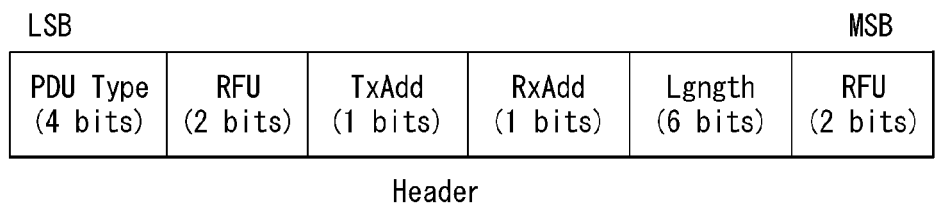
Header

[Fig.21]

| ADType (Octets 1) | ADData (0 ~ 26 Octets) ||
| --- | --- | --- |
| | Control Type (Octets 1) | Control Data (0 ~ 25 Octets) |

ADType and ADDATA

[Fig.22]

| ADType 2octets | ADData | | |
| --- | --- | --- | --- |
| | 6octets | 6octets | 6octets |
| Discoverable Mode Controller | Controller (Agent) Address | Controller (Agent) Information | Controller (Agent) Function Information |

ADType and ADDATA

[Fig.23]
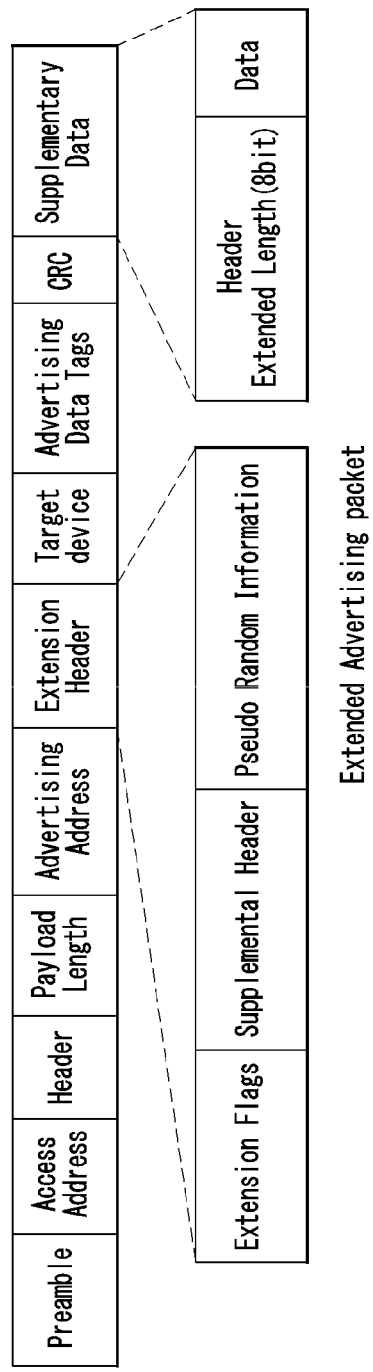

[Fig.24]
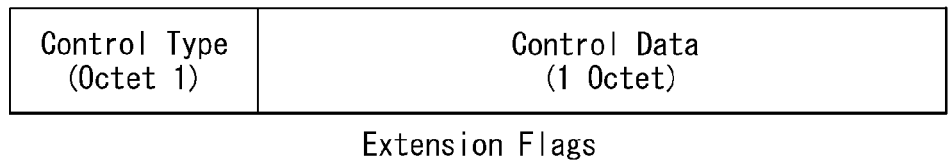
Extension Flags

[Fig.25]
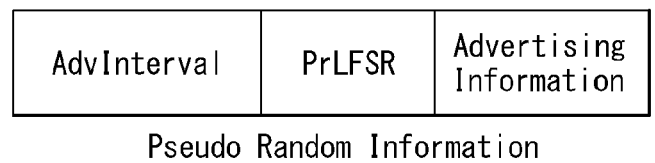
Pseudo Random Information

[Fig.26]
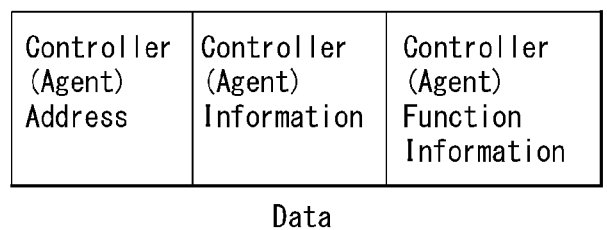
Data

[Fig.27]

| Opcode (Control Type) (Octet) | Description | Control Data (0 ~ 26 Octets) | Description |
|---|---|---|---|
| 0x00 | Query Current Device Status | None | Control device requests information of current Profile Role, Discoverability Mode, Connection Mode, Security Mode of controlled device |
| 0x01 | Discoverability Mode Change | 1 Octet<br>0x00<br>0x01<br>0x02<br>0x03<br>0x04<br>0x05 | Non-discoverable mode<br>Discoverable Mode enabled<br>Immediate Advertising enabled<br>Limited discoverable mode<br>General discoverable mode<br>Reserved |
| 0x02 | Advertising Interval Change | 2 octets<br>2 octets | Interval_Min : min of connInterval (1.25ms Unit)<br>Interval_Max : Max of connInterval (1.25ms Unit) |
| 0x03 | Profile Role Change | 1 Octet<br>0x00<br>0x01<br>0x02<br>0x03<br>0x04<br>0x05 | Slave<br>Broadcaster<br>Observer<br>Peripheral<br>Central<br>Reserved |
| 0x04 | Connection Mode Change | 1 Octet<br>0x00<br>0x01 | Non-Connectable Mode<br>Connectable Mode |
| 0x05 | Scan Mode Change | 1 Octet<br>0x00<br>0x01<br>0x02 | SCAN enabled<br>SCAN disabled<br>LONG_SCAN enabled |
| 0x06 | Security Mode Change | 1 Octet<br>0x00<br>0x01<br>0x02 | Authentication enabled<br>Authorization enabled<br>Data Signing enabled |
| 0x07 ~ 0xFF | Reserved | | |

[Fig.28]

| Characteristic Name | Requirement | Mandatory Properties |
|---|---|---|
| Peer Device | M | Read, Write, Indication |
| Device State | M | Read, Write, Indication |
| Remote Access Mode Change | M | Read, Write |
| Profile Role Change | M | Read, Write |
| TimerToBondedDvice | M | Read, Write |
| Advertising Duration | O | Read, Write |
| Scanning Duration | O | Read, Write |
| Standby Duration | O | Read, Write |
| Initiating Duration | O | Read, Write |
| Connection Duration | O | Read, Write |
| Advertising Type | O | Read, Write |
| Scanning Type | O | Read, Write |
| Supported Scanning | O | Read, Write |
| Control Point | M | Write, Indication |
| Connection Status | O | Read, Indication |
| WhiteList | O | Read, Write, Indication |
| WhiteList Control Point | O | Read, Write, Indication |
| Advertising Filter Policy |  | Read, Write, Indication |
| Scanning Filter Policy |  | Read, Write, Indication |
| Initiator Filter Policy |  | Read, Write, Indication |
| Connected Service Type | O | Read, Write, Indication |

[Fig.29]

(a) Device State

| Data Type | Type | Description |
|---|---|---|
| Current Device State | 8 bits Integer | Current Device State in which the device is operated now |
| Operated Device States | 8 bits integer | Operated Device States among which the device can be operated among |

(b) Format of Device State

| 7th bit | 6th bit | 5th bit | 4th bit | 3rd bit | 2nd bit | 1st bit | 0th bit |
|---|---|---|---|---|---|---|---|
| Mode | Remote Discoverable Mode Control | Discoverable Mode Changing | Connecting | initiating | Advertising | Standby | Scanning |

[Fig.30]

| 7th bit | 6th bit | 5th bit | 4th bit | 3rd bit | 2nd bit | 1st bit | 0th bit |
|---|---|---|---|---|---|---|---|
| RFU | | | | Non-Connected Undirected Event | Scannable Undirected Event | Connectable Directed Event | Connectable Undirected Event |

(a) Advertising Type

| 7th bit | 6th bit | 5th bit | 4th bit | 3rd bit | 2nd bit | 1st bit | 0th bit |
|---|---|---|---|---|---|---|---|
| RFU | | | | | | Passive Scanning | Active Scanning |

(b) Scanning Type

[Fig.31]
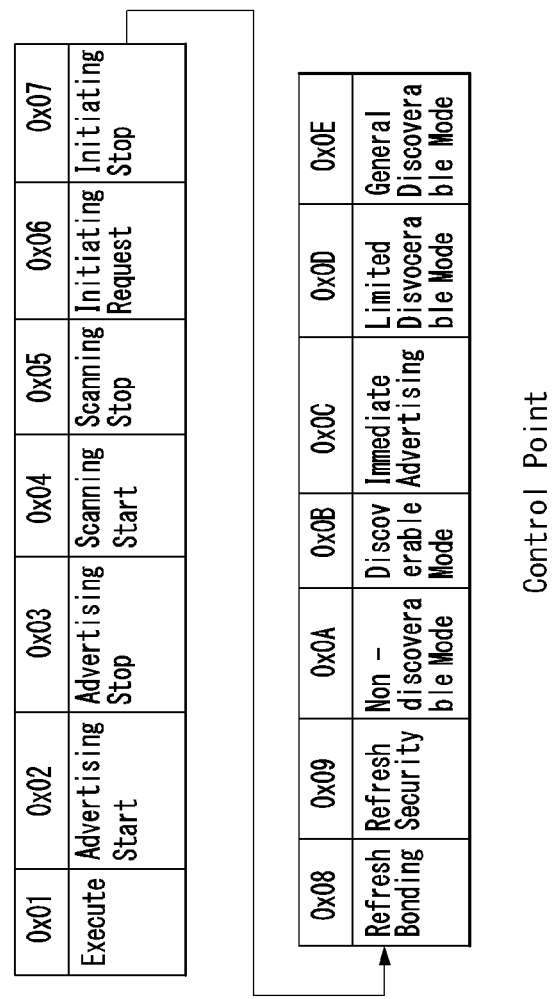

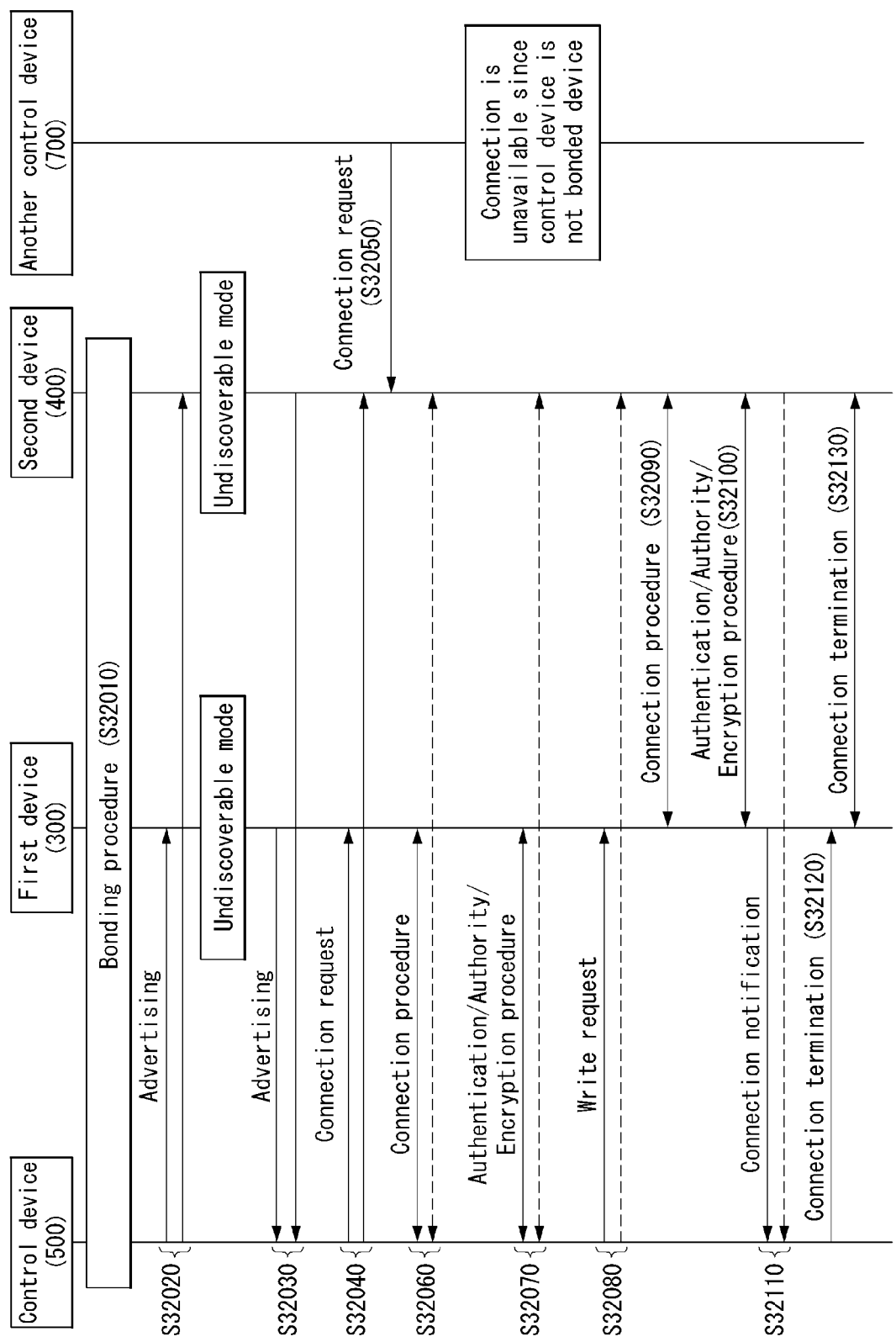
[Fig.32]

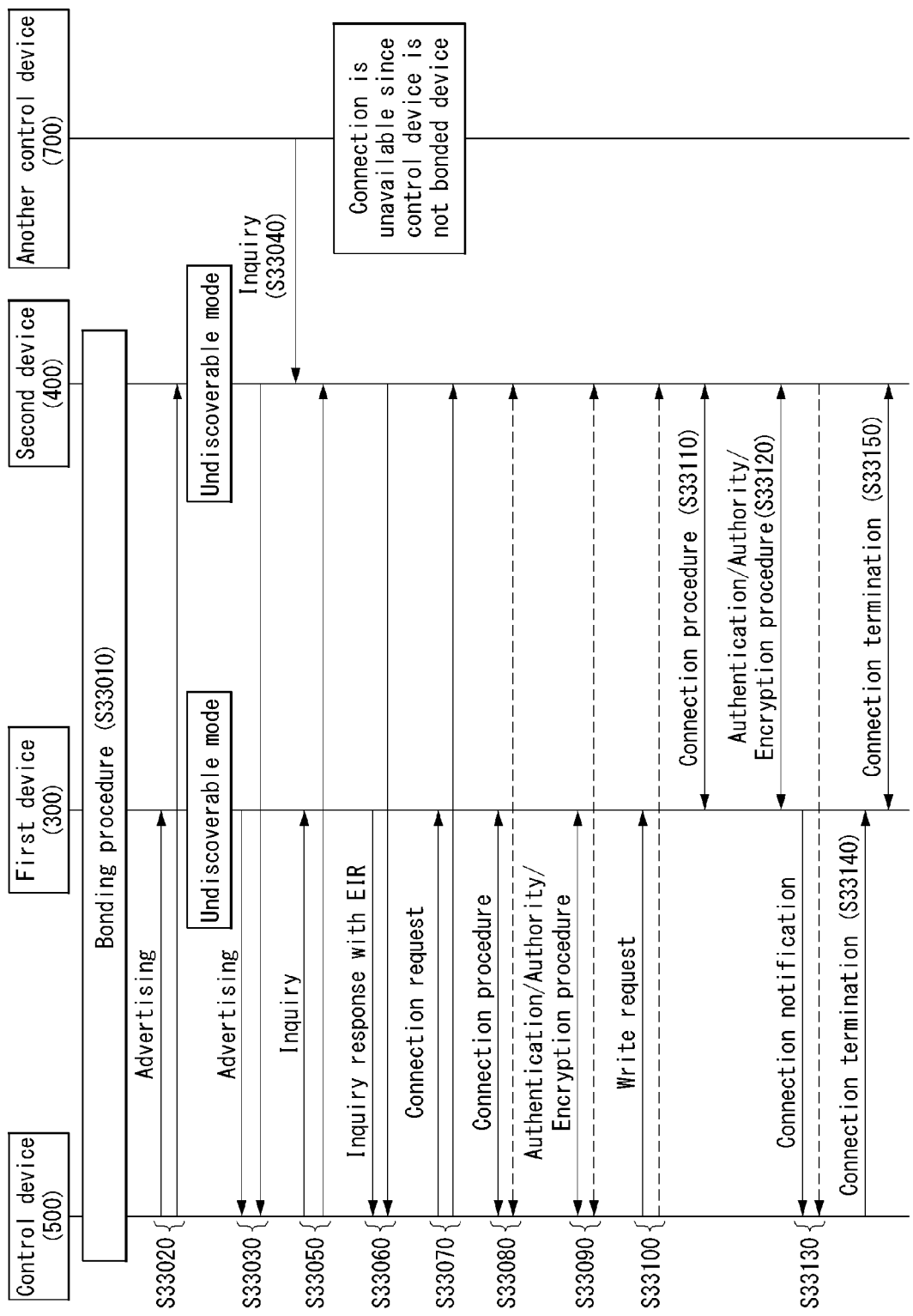
[Fig.33]

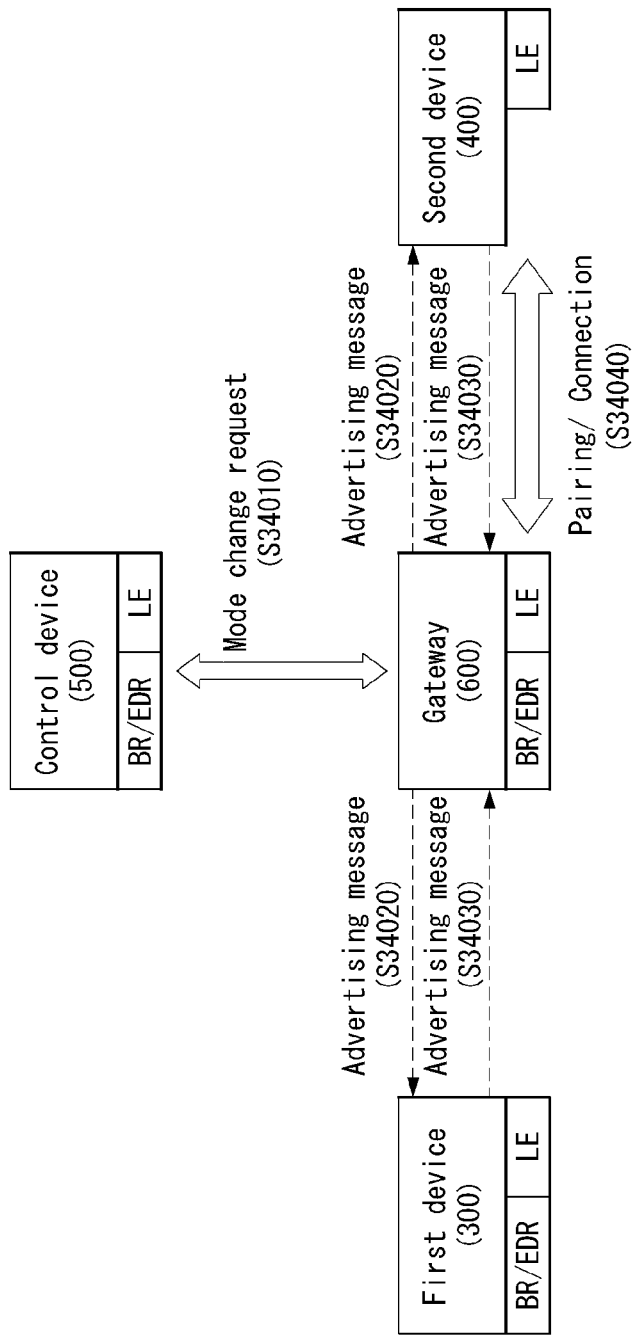
[Fig.34]

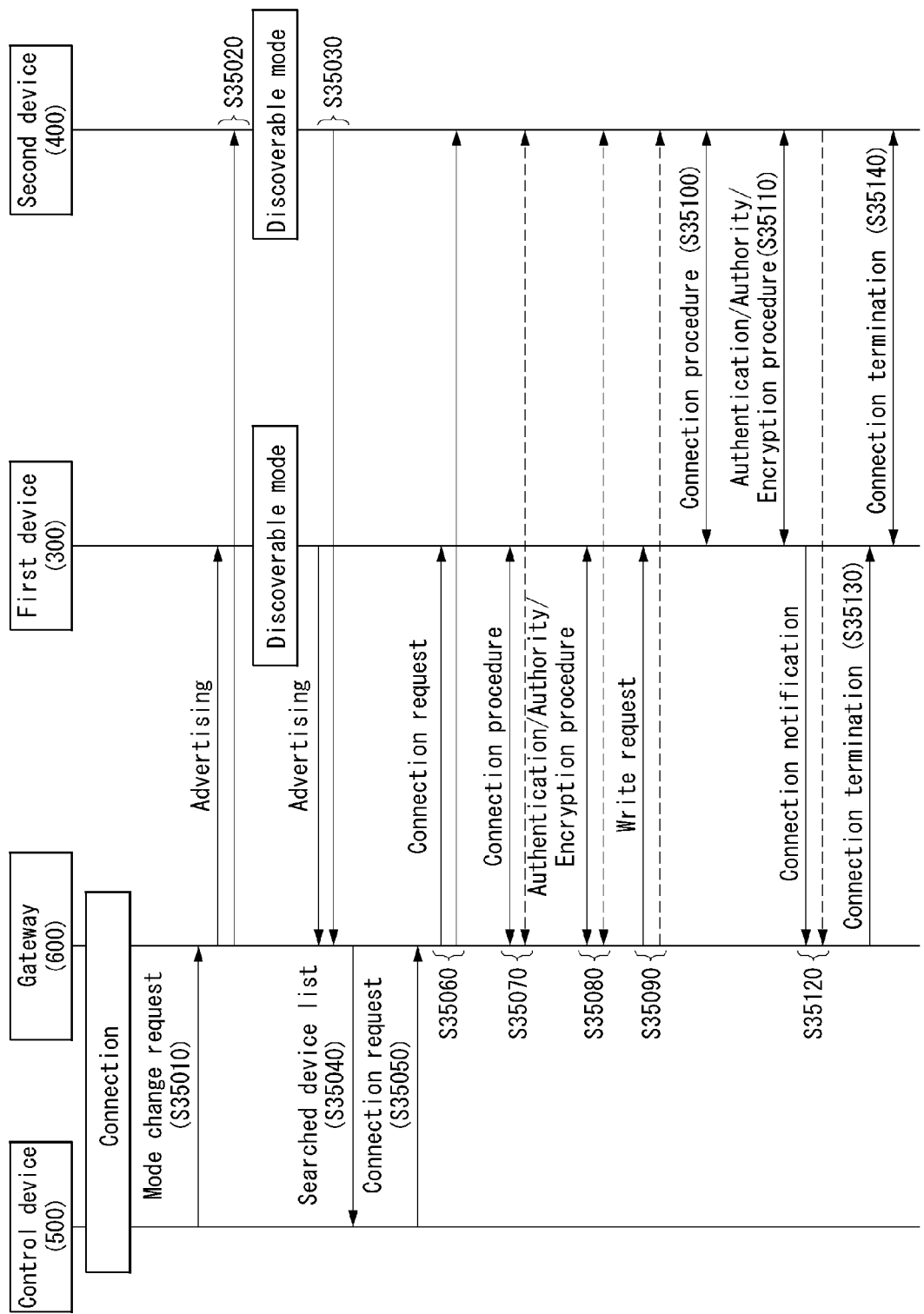
[Fig.35]

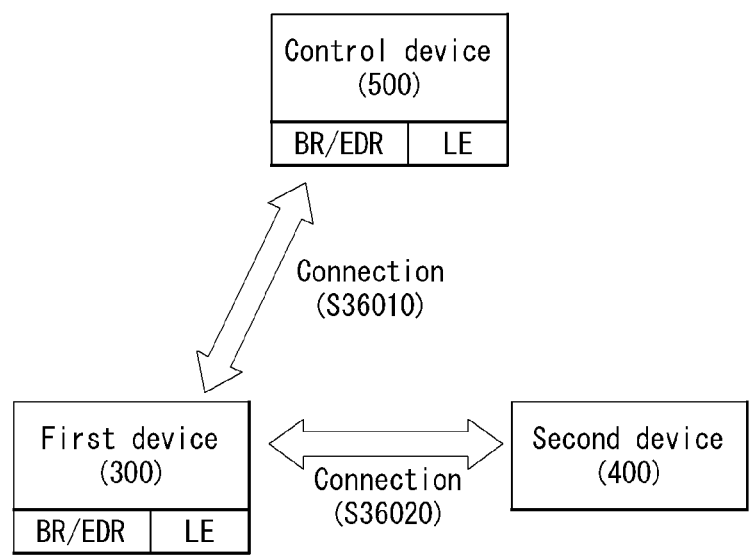
[Fig.36]

[Fig.37]
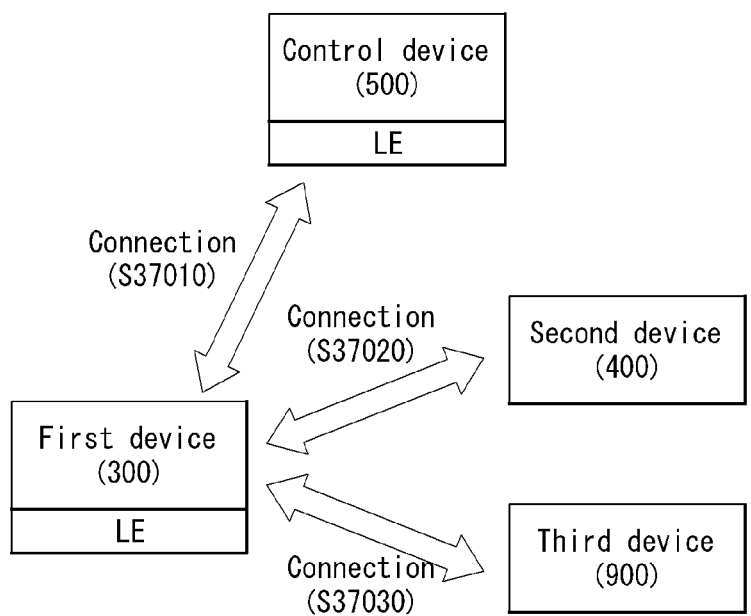

[Fig.38]

| Authority type | Authority | Description |
|---|---|---|
| Control | Connection Only | Only connection between devices is controllable |
| Control | Disconnection Only | Only connection termination between devices is controllable |
| Control | Pairing & Disconnection | Connection and connection termination between devices are controllable |
| Control | Delete Bonding Information | Available to delete Bonding information |
| Status Information | Pairing Status | |
| Status Information | Bonding Status | |

METHOD AND DEVICE FOR CONTROLLING DEVICE USING BLUETOOTH TECHNOLOGY

CROSS REFERENCE TO RELATED APPLICATIONS

This application is the National Phase of PCT International Application No. PCT/KR2016/000813, filed on Jan. 26, 2016, which claims priority under 35 U.S.C. 119(e) to U.S. Provisional Application No. 62/108,500, filed on Jan. 27, 2015, all of which are hereby expressly incorporated by reference into the present application.

TECHNICAL FIELD

The present invention relates to a method and apparatus for forming a connection between devices using the Bluetooth which is a short distance technique in wireless communication systems, and more particularly, to a method and apparatus for controlling a connection between devices using Basic Rate/Enhanced Data Rate (BR/EDR) or Bluetooth Lowe Energy (BLE) technique.

BACKGROUND ART

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An object of the present invention is to propose a method for controlling a device using Bluetooth Lowe Energy (LE) technique performed by a control device.

In addition, an object of the present invention is to propose a method for controlling a connection of a device using Bluetooth BR/EDR and Bluetooth Low Energy (LT) technique performed by a control device.

In addition, an object of the present invention is to propose a method for controlling a connection by changing modes of devices using Bluetooth BR/EDR and Bluetooth Low Energy (LT) technique performed by a control device.

In addition, an object of the present invention is to propose a method for controlling a connection by changing a discovery mode, a connection mode and/or a security mode of devices using Bluetooth BR/EDR and Bluetooth Low Energy (LT) technique performed by a control device.

In addition, an object of the present invention is to propose a method for controlling a connection by determining roles of devices controlled by a control device.

In addition, an object of the present invention is to propose a method for controlling a connection of other devices through a gateway that support various network communication techniques performed by a control device.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In order to solve the technical problem, the present invention proposes a method for controlling a connection between a first device and a second device using Bluetooth technique.

Particularly, a method for controlling a connection between a first device and a second device using Bluetooth according to an embodiment of the present invention performed by a control device includes transmitting to at least one of the first device or the second device a first advertising message including first control information for controlling a mode of the at least one device; receiving a second advertising message for searching the at least one device from the at least one device; performing a connection with at least one of the devices; transmitting a write request message including second control information indicating a connection with the second device to the first device; and receiving a write response message in response to the write request message, wherein the control information comprises at least one of a control type field indicating a control type or a data field including detailed control data according to the control type.

In addition, in the present invention, the first advertising message includes at least one of an address, information or a function of another control device.

In addition, in the present invention, the control type field includes at least one of role change information for controlling a role change of a device, discovery mode change information for controlling a change of a discovery mode, connection mode change information for controlling a change of a connection mode or security mode change information for controlling a change of a security mode.

In addition, in the present invention, the data field includes at least one of indiscoverable mode information indicating an indiscoverable mode, limited discovery mode information indicating a limited discovery mode or normal discovery mode information indicating a normal discovery mode.

In addition, in the present invention, the data field includes at least one of un-connectable mode information indicating an un-connectable mode or connectable mode information indicating a connectable mode.

In addition, in the present invention, the data field includes at least one of authentication information indicating that an authentication is available or authority configuration information indicating that an authority configuration is available.

In addition, in the present invention, the first advertising message includes at least one of first device information indicating the first device or second device information indicating the second device.

In addition, in the present invention, the information included in the control type field corresponds to the first device information or the second device information.

In addition, in the present invention, the second control information includes indication information indicating a change of a discovery mode of the first device.

In addition, in the present invention, the indication information indicates one of an undiscoverable mode, a limited discovery mode or a normal discovery mode.

In addition, in the present invention, the second control information further includes time information indicating a time when a connection is allowed for a bonded device only.

In addition, in the present invention, the first device is in an undiscoverable mode during the time when a connection is allowed for a bonded device only.

In addition, in the present invention, the write request message further includes information of the second device.

In addition, the present invention further includes receiving a notification message indicating that the first device is connected with the second device from the first device.

In addition, the present invention further includes receiving a connection termination message indicating that a connection is terminated from the first device, when a connection with the second device is terminated.

In addition, in the present invention, the control device and the first device are connected through Bluetooth Low Energy (LE).

In addition, the present invention includes a communication unit for communicating with a wired or wireless signal with exterior; and a processor functionally connected with the communication unit, wherein the processor is configured to: transmit to at least one of the first device or the second device a first advertising message including first control information for controlling a mode of the at least one device; receive a second advertising message for searching the at least one device from the at least one device; performing a connection with at least one device; transmitting a write request message including second control information indicating a connection with the second device to the first device; and receiving a write response message in response to the write request message, wherein the control information comprises at least one of a control type field indicating a control type or a data field including detailed control data according to the control type.

Technical Effects

According to a method for controlling a connection of a device using Bluetooth BR/EDR and Bluetooth Low Energy (LT) technique according to an embodiment of the present invention, there is an effect that a connection between different devices may be controlled by a control device.

In addition, the present invention has an effect that the control device can control the connection by changing modes of the devices using Bluetooth BR/EDR and LE (Low Energy) technology.

In addition, the present invention has an effect that a control device may control a connection by changing a discovery mode, a connection mode and/or a security mode of devices using Bluetooth BR/EDR and Bluetooth Low Energy (LT) technique.

In addition, the present invention has an effect that a control device may change roles of devices controlled by the control device.

In addition, the present invention has effect that a control device can control the connection of other devices through a gateway supporting various network communication technologies.

In addition, the present invention has an effect that a control device may change of modes of other devices through a gateway that support various network communication techniques.

The technical effects in the present invention are not limited to the above-described technical effects and other technical effects which are not described herein will become apparent to those skilled in the art from the following description.

DESCRIPTION OF DRAWINGS

FIG. 1 is a schematic view illustrating an example of a wireless communication system using a Bluetooth low energy technology to which the present invention is applicable.

FIG. 2 is an internal block diagram of an example of devices to which the present invention is applicable.

FIG. 3 is a view illustrating an example of a Bluetooth low energy topology.

FIG. 4 is a view illustrating an example of a Bluetooth communication architecture to which the present invention is applicable.

FIG. 5 is a view illustrating an example of a structure of a generic attribute profile (GATT) of Bluetooth low energy.

FIG. 6 is a flowchart illustrating a method for forming a connection between devices using the Bluetooth Low Energy (LE).

FIG. 7 is a flowchart illustrating a method for forming a connection using the Bluetooth Basic Rate/Enhanced Data Rate (BR/EDR) between devices.

FIG. 8 is a diagram illustrating an example of a method for changing a mode of a device for a connection between devices.

FIGS. 9 and 10 are diagrams illustrating an example of a method for controlling and connection other devices through a control device to which the present invention may be applied.

FIGS. 11 to 13 are diagrams illustrating an example of a message exchange method and a message format for controlling devices controlled by a control device to which the present invention may be applied.

FIG. 14 is a diagram illustrating an example of a method for devices to be connected through Bluetooth Low Energy (LE).

FIG. 15 is a diagram illustrating an example of a method for controlling and connecting other devices through the Bluetooth Low Energy (LE) by a control device to which the present invention may be applied.

FIG. 16 is a diagram illustrating another example of a method for controlling and connecting other devices through the Bluetooth Low Energy (LE) by a control device to which the present invention may be applied.

FIG. 17 is a diagram illustrating another example of a method for controlling and connecting other devices through the Bluetooth Low Energy (LE) by a control device to which the present invention may be applied.

FIG. 18 is a diagram illustrating another example of a method for controlling and connecting other devices through the Bluetooth Basic Rate/Enhanced Data Rate (BR/EDR) by a control device to which the present invention may be applied.

FIGS. 19 to 27 are diagrams illustrating an example of an Advertising Packet to which the present invention may be applied.

FIGS. 28 to 31 are diagrams illustrating an example of a Characteristic to which the present invention may be applied.

FIG. 32 is a diagram illustrating another example of a method for controlling and connecting other devices through the Bluetooth Low Energy (LE) by a control device to which the present invention may be applied.

FIG. 33 is a diagram illustrating another example of a method for controlling and connecting other devices through the Bluetooth Low Energy (LE) by a control device to which the present invention may be applied.

FIG. 34 is a diagram illustrating an example of a method for a control device to control other devices through a gateway to which the present invention may be applied.

FIG. 35 is a flowchart illustrating an example for a control device to control other devices through a gateway to which the present invention may be applied.

FIGS. 36 to 38 are diagrams illustrating another example of a method for a control device to control and connect other devices to which the present invention may be applied.

BEST MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

In addition, there is a plurality of devices that measure a physical activity of a human using a specific device, but there is no device that represents a particular data figure and the like to a user by transmitting a measured data through Bluetooth.

Accordingly, in order to solve the problem, the present invention proposes a method for measuring a human physical activity, and for providing it to a user by transmitting and processing a measured data through Bluetooth LE.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate, and thus, the power supply unit may supply power required for operations of the respective components even with small output power (10 mW (10 dBm) or less).

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a diagram illustrating a Bluetooth communication Architecture to which the present invention may be applied.

Referring to FIG. 4, FIG. 4(*a*) shows an example of a protocol stack of Bluetooth Basic Rate (BR)/Enhanced Data Rate (EDR), and FIG. 4(*b*) shows an example of a protocol stack of Bluetooth Low Energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR Baseband layer 14 and a Link Manager layer 16.

The BR/EDR PHY layer 12 is a layer of transmitting and receiving a radio signal of 2.4 GHz, and may transmit data by hopping 79 RF channels in the case of using Gaussian Frequency Shift Keying (GFSK) modulation.

The BR/EDR Baseband layer 14 takes the role of transmitting a Digital Signal, selects a channel sequence of hopping 1400 times per second, and transmits a time slot of 625 μs length for each channel.

The Link Manager layer 16 controls overall operations (link setup, control and security) of a Bluetooth connection by utilizing Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a Generic Access Profile (GAP) 40, a logical link control and adoption protocol (L2CAP) 41, a Security Manager (SM) 42, an Attribute Protocol (ATT) 440, a Generic Attribute Profile (GATT) 44, a Generic Access Profile 25 and an LT profile 46. However, the host stack is not limited thereto, but may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

The Bluetooth LE uses three fixed channels (one for signaling CH, one for the Security Manager and one for the Attribute protocol).

However, the Basic Rate/Enhanced Data Rate (BR/EDR) uses a dynamic channel, and supports protocol service multiplexer, retransmission, streaming mode, and so on.

The Security Manager (SM) 42 authenticates a device, and is a protocol for providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method

Time: Time information exchanging method

FindMe: Provision of alarm service according to distance

Proximity: Battery information exchanging method

Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a diagram illustrating an example of a Generic Attribute Profile (GATT) of Bluetooth Low Energy.

Referring to FIG. 5, it may be shown a structure for a Profile Data exchange of Bluetooth Low Energy.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method for measuring and storing a human physical activity using GATT-based operation structure of the Bluetooth LE performed by a sensor, and a method for loading the stored information from the sensor performed by a client.

FIG. 6 is a flowchart illustrating a method for forming a connection between devices using the Bluetooth Low Energy (LE).

As shown in FIG. 6, for the Bluetooth LE connection between a first device 300 and a second device 400, the first device 300 transmits an Advertising Message to the second device 400 (step, S6010).

As described above, the Advertising Message is used for providing the information of a device to another device by utilizing the Bluetooth LE, and may include various types of information such as the service information provided by the device, the user information, and so on.

After identifying the information included in the Advertising Message, the second device 400 transmits a connection request message for connecting the Bluetooth LE connection to the first device 300 (step, S6020), and the first device 300 and the second device 400 establish a Bluetooth Low Energy (LE) connection (step, S6030).

Such a method has a disadvantage that it is unable to establish a connection or it is hard to establish a connection between the first device 300 and the second device 400 and it is unable to identify a PIN number and to control a connection configuration, in the case that a User Interface (UI) is not existed in the first device 300 and/or the second device 400.

Accordingly, in order to solve the problem, the present invention proposes a method for performing a connection between the first device 300 and the second device 400 using a control device 500 in which a UI is existed, which is available for controlling a connection between devices.

FIG. 7 is a flowchart illustrating a method for forming a connection using the Bluetooth Basic Rate/Enhanced Data Rate (BR/EDR) between devices.

Referring to FIG. 7, the Bluetooth BR/EDR may be connected to a Bluetooth BR/EDR through a Discovery Procedure for discovering a device and a Connection Procedure which is discovered.

Hereinafter, each procedure will be described in detail.

Discovery Procedure

The first device 200 and the second device 300 in the Bluetooth BR/EDR disconnection state exist in a standby state, and then for searching the Bluetooth BR/EDR, the first device 200 exists in an inquiry state and the second device 300 becomes an inquiry scan state.

In the inquiry state, the first device 200 transmits an ID packet to perform a Bluetooth BR/EDR discovery procedure (S7010), and in response to the inquiry, the first device 200 receives a frequency hop synchronization (FHS) packet from the second device 300 (S7020).

When the second device 300 intends to transmit additional information to the second device 300, the second device 300 may transmit the additional information to the first device 200 using an enhanced inquiry (EIR) packet (S7030).

Table 1 below represents an example packet types and directions of the inquiry message, the inquiry response message and the EIR message.

TABLE 1

| Message | Packet Type | Direction | Hopping Sequence | Access Code and Clock |
|---------|-------------|-----------|------------------|------------------------|
| Inquiry | ID | master to slave | Inquiry | Inquiry |
| Inquiry response | FHS | slave to master | Inquiry response | Inquiry |

TABLE 1-continued

| Message | Packet Type | Direction | Hopping Sequence | Access Code and Clock |
|---------|-------------|-----------|------------------|------------------------|
| EIR | DM1, DM3, DM5, DH1, DH3, DH5 | slave to master | Inquiry response | inquiry |

When the first device 200 that verifies existence and information of other devices through such a search intends to be connected with the second device 300, the first device 200 performs a paging procedure.

Connection Procedure

In the connection procedure, the first device 300 enters a Paging State and the second device 400 enters a Paging Scan State.

The first device 300 transmits a page message to the second device 300 in the Paging State (step, S7040).

When the second device 400 receives the page message transmitted from the first device 300, the first device 300 enters a BR/EDR master response state of the BR/EDR Paging State and the second device 400 enters a BR/EDR slave state of the BR/EDR Paging State.

Later, the second device 400 transmits a slave page response message to the first device 300 in response to the page message (step, S7050), and the first device 300 transmits a master page response message of an FHS type to the second device 400 (step, S7060).

The first device 300 and the second device 400 tune the channel and the timing for exchanging data through steps S7040 to S7060.

When the connection procedure is completed, the first device 300 and the second device 400 are switched to the BR/EDR connected state.

Later, the second device 400 is switched to the hopping pattern of the first device 300, and in order to identify it, the first device 300 transmits the first packet of the POLL type to the second device 400 (step, S7070). The second device 400 that receives the first packet transmits a data packet to the first device 300 in response (step, S7080), and terminates the Bluetooth BR/EDR connection procedure.

Table 2 below represents an example of packet types and directions transmitted and received in the connection procedure.

TABLE 2

| Message | Packet Type | Direction | Hopping Sequence | Access Code and Clock |
|---------|-------------|-----------|------------------|------------------------|
| Page | ID | Master to slave | Page | Slave |
| Slave Page response | ID | Slave to master | Page response | Slave |
| Master Page response | FHS | Master to slave | Page | Slave |
| First packet | POLL | Master to slave | Channel | Master |
| Data packet | Any Type | Slave to master | Channel | Master |

FIG. 8 is a diagram illustrating an example of a method for changing a mode of a device for a connection between devices.

Referring to FIG. 8, in order for the first device 300 to perform a Bluetooth connection with the second device 400, the first device 300 should perform a connection by discovering the second device 400. However, in order for the first device 300 to discover the second device 400, the second device 400 should be in a discoverable mode.

That is, in the case of the Bluetooth BR/EDR, the first device 300 should be in an inquiry state, and the second device 400 should be in an inquiry scan state. And, in the case of the Bluetooth LE, the second device 400 should be in an Advertizing mode that transmits an Advertizing packet.

However, in order for the second device 400 to be existed in the discoverable mode, a user should change and directly manipulate the mode (e.g., discovery, connection, pairing available mode, etc.) of the first device 300 and the second device 400, and accordingly, there is a problem that it is hard to identify the device that request a connection.

In addition, when there is no User Interface (UI) for a user in the first device 300 and the second device 400, there is a problem that the user is unable to control the first device 300 and the second device 400.

Accordingly, in order to solve the problem above, the present invention proposes a method for performing a connection between devices by changing modes of other devices through a control device, even in the case that a user does not change the modes of devices personally.

FIGS. 9 and 10 are diagrams illustrating an example of a method for controlling and connection other devices through a control device to which the present invention may be applied.

FIG. 9 shows an example of a method for a control device to change modes of other devices and to establish a Bluetooth connection directly, and FIG. 10 shows an example of a method for a control device to change modes of other devices and to establish a Bluetooth connection through a gateway.

As shown in FIG. 9 and FIG. 10, a control device 500 may control the first device 300 and/or the second device 400 directly or through a gateway.

For example, the control device may identify and change the discovery mode, the role and the pairing state (security and bonding mode) of the first device 300 and/or the second device 400 directly or through a gateway 600.

In addition, the control device may obtain the information of the first device 300 and the second device 400.

For example, the control device may obtain the information such as the service information, the current state, and so on that the first device 300 and the second device 400 may provide with.

In addition, the control device 500 may control a connection of the first device 300 and the second device 400 directly or through the gateway 600. That is, the control device 500 may transmit a control message to the first device 300 or the second device 400 such that the first device 300 or the second device 400 performs a connection with other device.

In this case, in order to control a connection state of the first device 300 and/or the second device 400, the control device 500 should know the information (e.g., interface information, service information, etc.) of the first device 300 and/or the second device 400. The control device 500 may obtain the information directly or through the gateway 600.

Table 3 below represents an example of the types of information required for the control device 500 to control other devices directly.

TABLE 3

ID of a control device

Address ID of Master and Slave devices controlled by the control device
Service IDs of the device controlled by the control device
(UUID: (Incomplete List or Complete List) and (16bit, 32bit or 128 bit Service UUID)

TABLE 3-continued

ID of a control device

Profile IDs of the device controlled by the control device
(UUID: (Incomplete List or Complete List) and (16bit, 32bit or 128 bit Service UUID)
Device state of the device controlled by the control device
(Current Device State, Operated Device State)
Security information supported by the device controlled by the control device (Security Mode, Security Level)
Type information of the wireless communication technique supported by the device controlled by the control device
Bonding information of the device controlled by the control device
Connection information of the device controlled by the control device Table 4 below represents an example of the types of information required for the control device 500 to control other devices through the gateway 600.

TABLE 4

Service IDs supported by neighboring devices discovered by the gateway
(UUID: (Incomplete List or Complete List) and (16bit, 32bit or 128 bit Service UUID)
Profile IDs supported by neighboring devices discovered by the gateway
(UUID: (Incomplete List or Complete List) and (16bit, 32bit or 128 bit Service UUID)
ID of the control device supported by neighboring devices discovered by the gateway
State information of neighboring devices discovered by the gateway
(Current Device State, Operated Device State)
Security information supported by neighboring devices discovered by the gateway
(Security Mode, Security Level)
Type information of the wireless communication technique supported by neighboring devices discovered by the gateway
Bonding information of neighboring devices discovered by the gateway
Connection information of neighboring devices discovered by the gateway
Pairing information of neighboring devices discovered by the gateway FIGS. 11 to 13 are diagrams illustrating an example of a message exchange method and a message format for controlling devices controlled by a control device to which the present invention may be applied.

Referring to FIG. 11, the control device 500 may transmit a control message including the control information (first control information) for controlling the first device 300 (step, S11010), and the first device 300 may transmit an information message including the information of the first device to the control device 500 (step, S11020).

The control message may be an Advertising message or a Scan Request message in the case that the control device 500 and the first device 300 are not connected through Bluetooth, and may be a write request message for requesting a writing in a characteristic of GATT Data base in the case that the control device 500 and the first device 300 are connected through Bluetooth.

FIG. 12 shows an example of a format of the control message. As shown in FIG. 12, the control device 500 may change the role, the discovery mode, the connection mode or the security mode, and the like of the first device 300 through the control message.

The control information included in the control message may include a Control Type field and a Control Value field.

The Control Type field of FIG. 12 shows a type which is going to be controlled.

Below represents an example of a value that may be included in the Control Type field shown in FIG. 12.
 Profile Role Change: change the role of a device
  Discoverability Mode Change: change the discovery mode Connection Mode Change: change the connection mode Security Mode Change: change the security mode For example, in the case that the value of the Control Type field is Discoverability Mode Change, the control message is the message for controlling the discovery mode of the first device.

The Control Value field is a field that includes a particular control value according to the Control Type field, and may include a particular value which is going to be changed.

For example, in the case that the value of the Control Type field is Discoverability Mode Change, the Control Value field may have the Non-discoverable mode value in which it is unable to discover a device according to the Control Type field.

In this case, the first device 300 that receives the control message changes its own mode to the Non-discoverable mode such that neighboring devices are unable to discover the first device 300.

Through the control message, the control device 500 may control the first device 300.

The first device may transmit the information required for the control to the control device 500 by transmitting a control message to the control device.

FIG. 13 show an example of a format of the control message, and the security information field includes information such as an I/O which is supported, a security requirement of the first device (authentication, encryption and authority).

GAP Role field may include the information that represents a role of the first device, and Connection/Pairing Status field may include information that represents the current connection/pairing state of the first device 300.

Through such information, the control device 500 may obtain the information of the first device 300.

The representation of the control message is just an example, but may be called by various terms.

FIG. 14 is a diagram illustrating an example of a method for devices to be connected through Bluetooth Low Energy (LE).

Referring to FIG. 14, the connection procedure of the Bluetooth LE described in FIG. 6 may be identified according to the state of a device.

Particularly, in order to transmit an Advertising packet for notifying its own presence to neighboring devices, the first device 300 enters an advertising mode (step, S14010).

The first device 300 that enters the advertising mode transmits an advertising packet in an advertising channel.

In this case, the advertising channel may have index 37, 38 and 39, and a PDU type of the advertising packet may be "ADV_IND".

In the case that the first device 300 is in the sleep state, that is, in the standby state that it is unable to receive or transmit a packet when transmitting the advertising packet, the second device 400 may not receive the advertising packet transmitted by the first device 300. Accordingly, the second device 400 is unable to search (or discover) the first device 300.

The first device 300 enters the scan mode for searching neighboring devices (step, S14020).

The first device 300 that enters the scan mode may receive the advertising packet transmitted from the neighboring devices in the advertising channel, and may search (or discover) the neighboring devices.

For example, as shown in FIG. 14, the second device 400 may transmit the advertising packet in advertising channel index 37, 38 and 39 in order to inform the existence of the second device to the neighboring devices.

The first device 300 in the scan mode may search the second device 400 by receiving the advertising packet transmitted from the second device 400 in the advertising channel index 37.

In the case that the first device 300 is going to connect the second device 400 which is searched through the Bluetooth LE, the first device 300 transmits a connection request message to the second device 400 (S14040).

Later, the first device 300 and the second device 400 are connected through the Bluetooth LE.

As such, in order for the first device 300 and the second device 400 to be connected through the Bluetooth LE, each device should transmit an advertising packet in the advertising mode or receive the advertising packet transmitted from neighboring device through the scan mode.

However, there is a problem that such a mode should be changed by a user directly to each mode, not changed automatically by the device.

Accordingly, in order to solve the problem, it is proposed a method for changing a mode by controlling devices by a control device, not a user.

FIG. 15 is a diagram illustrating an example of a method for controlling and connecting other devices through the Bluetooth Low Energy (LE) by a control device to which the present invention may be applied.

Referring to FIG. 15, a control device may change a mode of each device by controlling the devices, and may control the Bluetooth LE connection of the devices through the changed mode.

Particularly, the control device 500 transmits an advertising message (a first advertising message) in an advertising channel to neighboring devices (the first device and the second device) (step, S15010).

In this case, the first advertising message may include first control information for controlling the first device 300 and the second device 400, and the first device may receive the first advertising message in advertising channel index 37, and the second device 400 may receive the first advertising message in advertising channel index 38.

As shown in FIG. 12, the first control information may include a Control Type field representing the operation that the control device controls, that is, a control type and a Control Data field including control data that indicates a particular operation according to the control type.

For example, in the case that the control device includes the control information for changing the first device 300 and the second device 400 to the advertising mode or the Discoverable mode in which a discovery is available in the first advertising message, the first device 300 and the second device 400 that receives the first advertising message enters the advertising mode or the discoverable mode (step, S15020).

The first device 300 and the second device 400 that enter the advertising mode or the discoverable mode transmit an advertising message (a second advertising message) for informing themselves to neighboring devices in the advertising channel.

The control device 500 existed in the scan mode in the advertising channel may search the first device 300 and the second device 400 by receiving the second advertising message (step, S15030).

The control device 500 that searches the first device 300 and the second device 400, in the case of trying to connect with the first device 300 through the Bluetooth LE, transmits a connection request message to the first device 300 (step, S15040).

Later, the control device and the first device 300 are connected through the Bluetooth LE.

The control device 500 connected with the first device 300 through the Bluetooth LE transmits a control message that includes the second control information to the first device in order to control the operation of the first device 300 (step, S15050).

For example, in the case of controlling such that the first device is connected with the second device, the control device may transmit the second indication information indicating the connection with the second device with being included in the control message to the first device 300.

The control message may include the Control Type field and the Control Value field shown in FIG. 12 above.

The expression of the control message is just an example, and may be used by other expression such as a write request message.

The first device 300 that receives the control message transmits a connection request message to the second device for performing a connection with the second device 400 through the Bluetooth LE (step, S15060).

The first device 300 connected with second device 400 through the Bluetooth LE may inform that the first device 300 is connected with second device 400 to the control device 500 by transmitting a control response message to the control device 500 (step, S15070).

The expression of the control response message is just an example, and may be used by other expression such as a write response message.

As such, by controlling the operation of other devices through the control device, a user may search or connect the devices even in the case that the user does not manipulate the devices directly.

FIG. 16 is a diagram illustrating another example of a method for controlling and connecting other devices through the Bluetooth Low Energy (LE) by a control device to which the present invention may be applied.

Referring to FIG. 16 above, the control device may control devices to be connected through the Bluetooth LE by controlling the devices to be discoverable, and the connected device is to connect with other device.

Particularly, the control device transmits an advertising message (a first advertising message) for informing the presence of the control device to other devices (step, S16010).

The advertising message may be unicasted, multicasted or broadcasted depending on the type of a PDU, and may be represented as an advertising Packet Data Unit (PDU), an advertising packet, an advertisement, an advertising frame, an advertising physical channel PDU, and so on.

As described above with reference to FIG. 12, the first advertising message includes the first control information for controlling operations of the devices.

The first control information may further include time information that represents a time when a connection is allowed only for the device which is bonded during a configured time, in addition to the Control Type filed and the Control Value field described with reference to FIG. 12.

Hereinafter, the case that the Control type of the first control information is the discovery mode change and the Control Value is the discoverable mode will be described, for example.

The first device 300 and the second device 400 that receives the first advertising message change their modes to the discoverable mode such that neighboring devices may search their own devices through the Bluetooth LE. In this case, the discoverable mode may be the advertising mode.

The first device 300 and the second device 400 changed to the discoverable mode transmit an advertising message (a second advertising message) such that the control device may search their own devices (step, S16020).

The control device 500 that receives the second advertising message from the first device 300 and the second device 400 may search the first device 300 and the second device 400 through the Bluetooth LE.

The control device 500 transmits a connection request message to the first device 300 and the second device 400 in order to establish a Bluetooth LE connection with the first device 300 or the second device 400 (step, S16030).

Later, the control device 500 may be connected to the first device 300 or the second device 400 by performing a connection procedure with the first device 300 or the second device 400 (step, S16040).

The control device 500, and the first device 300 or the second device 400 that are connected through the Bluetooth LE perform through an Authentication Procedure, an Authorization Procedure and an Encryption Procedure according to a security mode (step, S16050).

The control device 500 may transmit a write request message including the second control information to the first device 300 or the second device 400 in order to control the first device 300 or the second device 400.

For example, the first device 300 transmits the write request message that requests to write in a control point included in the Characteristic (step, S16060).

The Control Point is the characteristic for controlling an operation (e.g., security mode, search mode, advertising type, scan type or role, etc.) of the first device 300, and will be described in detail below.

Hereinafter, the case of indicating a connection with the second device 400 or the first device 300 through the Control Point will be described as an example.

The first device 300 or the second device 400 that receives the write request from the control device 500 transmits a write response message in response, and establishes a Bluetooth LE connection between the first device 300 and the second device 400 through the connection procedure (step, S16070).

Later, the first device 300 and the second device 400 perform through an Authentication Procedure, an Authorization Procedure and an Encryption Procedure according to a service that is going to provide or a security mode of a device (step, S16080).

The first device 300 or the second device 400 may notify that the Bluetooth LE connection is established to the control device 500 through a connection notification message (step, S16090).

When the control device 500 is going to terminate the Bluetooth LE connection by controlling the first device 300 or the second device 400, the control device 500 transmits a connection terminate message that indicates a connection termination to the first device 300 or the second device 400 (step, S16100).

The first device 300 or the second device 400 that receives the connection terminate message terminates the connection with the second device 400 or the first device 300 (step, S16110).

Through the method described above, the control device 500 may control the first device 300 and the second device 400 to be discoverable by changing a mode of the first device 300 and the second device 400, and may control a connection and a connection termination by requesting a write-in to GATT DATA base characteristic.

FIG. 17 is a diagram illustrating another example of a method for controlling and connecting other devices through the Bluetooth Low Energy (LE) by a control device to which the present invention may be applied.

Referring to FIG. 17 above, the control device may control devices such that the mode of each device is changed, and the devices are connected through the Bluetooth BR/EDR according to the changed mode.

First, since steps S17010 to S17030 are the same as the steps S15010 to SS15030 of FIG. 15, the description will be omitted.

The control device 500 that searches the devices through an advertising message transmitted from the first device 300 and the second device 400 transmits an Inquiry Message to the first device 300 and the second device 400 in order to obtain the information in relation to the Bluetooth BR/EDR state of the first device 300 and the second device 400 (step, S17040).

The first device 300 and the second device 400 that receives the inquiry message transmit an inquiry response message in response (step, S17050).

In this case, the first device 300 and the second device 400 may transmit an EIR message that includes a mode and/or state information of their own Bluetooth BR/EDR additionally to the control device 500.

Later, the control device establishes the Bluetooth LE connection by transmitting a connection request message to the first device 300 (step, S17060).

The control device 500 connected to the first device 300 through the Bluetooth LE transmits a control message that includes second control information to the first device 300 in order to control the operation of the first device 300 (step, S17070).

For example, in the case that the control device 500 controls such that first devices is connected with the second device through the Bluetooth BR/EDR, the control device 500 may transmit the second control information indicating the Bluetooth BR/EDR with the second device with being included in the control message to the first device 300.

The control message may include the Control Type field and the Control Value field shown in FIG. 12 above.

In addition, in the case that the control device 500 is going to control through the characteristic of the GATT, the control message may be a write request message that requests to write in the characteristic that will be described below in the Control Point.

The expression of the control message is just an example, and may be used by other expression such as a write request message.

The first device 300 that receives the control message establishes the Bluetooth BR/EDR connection with the second device through the inquiry state of the discovery procedure and the paging state of the connection procedure as described with reference to FIG. 7.

FIG. 18 is a diagram illustrating another example of a method for controlling and connecting other devices through the Bluetooth Basic Rate/Enhanced Data Rate (BR/EDR) by a control device to which the present invention may be applied.

Referring to FIG. 18 above, the control device may control devices such that the state or the mode of the devices is changed, and the device is connected with other device by controlling the connected device.

Particularly, the control device transmits an advertising message (a first advertising message) in order to notify its own presence to other devices (step, S18010).

The advertising message may be unicasted, multicasted or broadcasted depending on the type of a PDU, and may be represented as an advertising Packet Data Unit (PDU), an advertising packet, an advertisement, an advertising frame, an advertising physical channel PDU, and so on.

As described above with reference to FIG. 12, the first advertising message includes the first control information for controlling operations of the devices.

The first control information may further include time information that represents a time when a connection is allowed only for the device which is bonded during a configured time, in addition to the Control Type filed and the Control Value field described with reference to FIG. 12.

Hereinafter, the case that the Control type of the first control information is the discovery mode change and the Control Value is the discoverable mode will be described, for example.

The first device 300 and the second device 400 that receives the first advertising message change their modes to the discoverable mode such that neighboring devices may search their own devices through the Bluetooth LE and BR/EDR. For example, the Bluetooth LE may enter the Advertising Mode, and the Bluetooth BR/EDR may enter the Inquiry Scan mode.

The first device 300 and the second device 400 changed to the discoverable mode transmit an advertising message (a second advertising message) such that the control device may search their own devices (step, S18020).

The control device 500 that receives the second advertising message from the first device 300 and the second device 400 may search the first device 300 and the second device 400 through the Bluetooth LE.

The control device 500 that searches the devices through the advertising message transmitted from the first device 300 and the second device 400 transmits an Inquiry Message to the first device 300 and the second device 400 in order to obtain the information in relation to the Bluetooth BR/EDR state of the first device 300 and the second device 400 (step, S18030).

The first device 300 and the second device 400 that receive the inquiry message transmit an inquiry response message in response (step, S18040).

The inquiry response message may include maximum connection information that represents the number of maximum connectable devices.

In this case, the first device 300 and the second device 400 may transmit an EIR message that includes a mode and/or state information of their own Bluetooth BR/EDR additionally to the control device 500.

In order to establish the Bluetooth LE connection with the searched first device 300 or second device 400, the control device transmits a connection request message to the first device 300 and the second device 400 (step, S18050).

Later, the control device 500 may be connected to the first device 300 or the second device 400 by performing a connection procedure with the first device 300 or the second device 400 (step, S18060).

The control device 500, and the first device 300 or the second device 400 that are connected through the Bluetooth LE perform through an Authentication Procedure, an Authorization Procedure and an Encryption Procedure according to a security mode (step, S18070).

The control device 500 may transmit a write request message including the second control information to the first device 300 or the second device 400 in order to control the first device 300 or the second device 400.

For example, the first device 300 transmits the write request message that requests to write in a control point included in the Characteristic (step, S18080).

The Control Point is the characteristic for controlling an operation (e.g., security mode, search mode, advertising type, scan type or role, etc.) of the first device 300, and will be described in detail below.

Hereinafter, the case of indicating a Bluetooth BR/EDR connection with the second device 400 or the first device 300 through the Control Point will be described as an example.

The first device 300 or the second device 400 that receives the write request from the control device 500 transmits a write response message in response, and establishes a Bluetooth BR/EDR connection with the first device 300 or the second device 400 through the connection procedure described with reference to FIG. 7 (step, S18090).

Later, the first device 300 and the second device 400 perform through an Authentication Procedure, an Authorization Procedure and an Encryption Procedure according to a service that is going to provide or a security mode of a device (step, S18100).

In this case, the Authentication Procedure may be performed through the numeric comparison scheme and/or the Passkey Entry scheme.

The first device 300 or the second device 400 may notify that the Bluetooth BR/EDR connection is established to the control device 500 through a connection notification message (step, S18110).

When the control device 500 is going to terminate the Bluetooth BR/EDR connection by controlling the first device 300 or the second device 400, the control device 500 transmits a connection terminate message that indicates a connection termination to the first device 300 or the second device 400 (step, S18120).

The first device 300 or the second device 400 that receives the connection terminate message terminates the connection with the second device 400 or the first device 300 (step, S18130).

Through the method described above, the control device 500 may control the first device 300 and the second device 400 to be discoverable by changing the Bluetooth BR/EDR mode of the first device 300 and the second device 400, and may control a connection and a connection termination by requesting a write-in to GATT DATA base characteristic.

FIGS. 19 to 27 are diagrams illustrating an example of an Advertising Packet to which the present invention may be applied.

FIG. 19 shows an example of the advertising message that the control device transmits to control other devices in FIG. 14 to FIG. 18. The control device may control the role, the state, the mode, and the like of the devices through the advertising message.

The advertising message may include Preamble field, Access Address field, Header field, Payload field and CRC.

The Header field may be constructed as shown in FIG. 20.

The PDU Type field represents a PDU type of the advertising message, and may be one of "0000", "0001" or "0010" of Table 1 above, or may have a newly defined type value.

The TxAdd field and the RxAdd field include the information for the PDU type.

The Payload may include an advertiser address field, a Length field and one or more ADType fields and ADData fields as shown in FIG. 19.

The advertiser address field is a field that represents an address of the control device, and the ADType and ADData may be constructed as shown in FIG. 21 or FIG. 22.

The ADType is a field that represents a type of the Payload, and may include a type value for the control device to control devices through the advertising message.

FIG. 21 shows an example of the ADData for the control device to control devices, the ADData may include the Control Type and the Control Data described with reference to FIG. 12 above.

The Control Type may include the following value according to the operation to control.
  Profile Role Change: To change a role of device
  Discoverability Mode Change: To change a discovery mode
  Connection Mode Change: To change a connection mode
  Security Mode Change: To change a security mode
  Query Current Device State: To ask a current state of a controlled device
  Advertising Interval Change: To change a transmission period of an advertising message
  Scan Mode Change: To change a scan mode The Control Value field is a field that includes a particular control value according to the Control Type field, and may include a particular value to change.

The Control Value may have the values represented in Table 5 below according to the Control Type.

TABLE 5

| Control Type | Control value |
| --- | --- |
| Profile Role Change | Master, Slave, Broadcast, Observer, Peripheral, Central |
| Discoverability Mode Change | Non-discoverable mode, Discoverable Mode enabled, Immediate Advertising enabled, Limited discoverable mode, General discoverable mode |
| Connection Mode Change | Connectable mode, Non-Connectable mode |
| Security Mode Change | Authentication enabled/Disabled, Authorization enabled/Disabled, Data Signing enabled/Disabled |
| Query Current Device State | None |
| Advertising Interval Change | Interval Min, Interval Max |
| Scan Mode Change | SCAN enabled, SCAN disabled, LONG_SCAN enabled |

When the Control Type is the Profile Role Change, the Control Value may have a value that represents a role of the devices. Through this, the control device may control the role of the devices controlled.

When the Control Type is the Discoverability Mode Change, the Control Value may have a value that represents a discovery mode of the devices. In this case, each of the values of the Control Value is as follows.
  Non-discoverable mode: This is a mode in which discovery is unable, and in this mode, a neighboring device is unable to search the device existed in the Non-discoverable mode.
  Discoverable Mode enabled: This is a mode of activating the Discoverable Mode, and neighboring devices are able to search the device existed in the Discoverable Mode. For example, the Advertising mode may be existed for the Bluetooth LE and the inquiry mode may be existed for the Bluetooth BR/EDR.
  Immediate Advertising enabled: Immediately changed to the Advertising mode
  Limited discoverable mode: This is a limited discovery mode, and in the case that a specific condition is satisfied, it is available to be searched by neighboring devices only for limited time duration.

General discoverable mode: This is a general discovery mode, and neighboring devices may search the device in the mode.

Through the Discoverability Mode Change, the control device may make the controlled devices be discoverable or non-discoverable.

When the Control Type is the Discoverability Mode Change, the Control Value may have a value that represents a connection mode of the devices. In this case, each of the values of the Control Value is as follows.

Connectable mode: A mode in which a connection is available.
Non-Connectable: A mode in which a connection is unavailable.

When the Control Type is the Security Mode Change, the Control Value may have a value that represents a security mode of the devices. In this case, each of the values of the Control Value is as follows.

Authentication enabled/Disabled: An Authentication procedure is enabled/disabled.
Authorization enabled/Disabled: An Authorization procedure is enabled/disabled.
Data Signing enabled/Disabled: A Data Signing procedure is enabled/disabled.

When the Control Type is the Query Current Device State, since state is to request the information of the current state of the device, the Control Value has none value.

When the Control Type is the Advertising Interval Change, which is to change a transmission interval of an advertising message of the controlled device, and the Control Value is as follows.

Interval Min: To change to a minimum interval
Interval Max: To change to a maximum interval When the Control Type is the Scan Mode Change, which is to activate or deactivate the scan mode of the controlled device, and the Control Value is as follows.

SCAN enabled: To activate a scan mode
SCAN disabled: To deactivate a scan mode
LONG_SCAN enabled: To activate a long scan mode FIG. 22 shows another example of the ADData. In the case that that is another control device is existed in addition to the control device, the ADData shown in FIG. 22 may be used for transmitting the information to the controlled devices.

In this case, the ADData may include Controller Address field representing an address of another control device, Controller information field representing information of another control device and Controller Function Information field including information in relation to another control device.

FIG. 23 is an example of another packet format of an advertising message, which has an extended length in comparison with the advertising message of FIG. 19.

First, the description of fields described with reference to FIG. 19 to FIG. 22 will be omitted.

Target Device field includes the information of the devices that receives the advertising message, and through the field, it is available for specific UEs to receive the advertising message.

In addition, the Target Device field may include the role of each device with being corresponded to the information of each device (e.g., address, identifier, etc.) as well as the device information.

Through this, the control device may differently configure the role of a plurality of devices through the advertising message.

Extension Flag field is a field including the control information as shown in FIG. 24, and may include the Control Type field and the Control Data field described with reference to FIG. 19 to FIG. 21.

Pseudo Random Information field may include Advinterval field that represents an interval in which the advertising message is transmitted, PrLFSR field and Advertising information field as shown in FIG. 25.

The Data field in FIG. 23 is a field including the information of another control device, as shown in FIG. 26, may be constructed as the same as ADData of FIG. 22.

FIG. 27 is a diagram illustrating an example of a value of Opcode of the Control Type and a value of the Control Data described above.

FIGS. 28 to 31 are diagrams illustrating an example of a Characteristic to which the present invention may be applied.

Referring to FIG. 28, a device may be controlled through the Generic Attribute Profile (GATT) Characteristic of the Bluetooth.

The description of the characteristic shown in FIG. 28 is as follows.

Peer Device: This is a characteristic representing an Address value and a name of a counterpart device to connect, and an address of the device paired through the configuration of the value may be provided.
Device State: This means Scanning, Standby, Advertising, Initiating, and Connection State that corresponds to Link Layer State of a controlled device, and may designate a state or several states. Through a write, it is available to request to perform the corresponding state function, and the current state of the controlled device may be identified through a read. And, a state change of the controlled device may be identified through an indication.
Remote Access Mode Change: This is a characteristic representing whether it is available to change the mode of a device, and in the case that this characteristic is enabled, the role, the discovery mode, the connection mode, the security mode, and the like may be changed by receiving the control information of the control device.
Profile Role Change: This is a characteristic representing whether it is available to change the role of a device, and in the case that this characteristic is enabled, by receiving the control information of the control device, the role such as Slave, Broadcaster, Observer, Peripheral, Central, and so on may be changed.
TimerToBondedDevice: This is time information representing a connectable time, and a connection is allowed only to the bonded device during the configured time.
Advertising Duration: This is time information in relation to an Advertising State operation of a device, and in the case that the device is in other state, the corresponding value is meaningless (may include an Advertising Interval concept).
Scanning Duration: This is time information in relation to a Scanning State operation of a device, and in the case that the device is in other state, the corresponding value is meaningless (may include a concept of Scanning Interval and/or Scanning window).
Standby Duration: This is time information in relation to a Standby State operation of a device, and in the case that the device is in other state, the corresponding value is meaningless.

Initiating Duration: This is time information in relation to an Initiating State operation of a device, and in the case that the device is in other state, the corresponding value is meaningless.

Connection Duration: This is time information in relation to an Initiating State operation of a device, and in the case that the device is in other state, the corresponding value is meaningless (may include a concept of Connection event Interval, slave latency supervisionTimeout, connection event Transmit Window (size, offset)).

Advertising Type: This is to define a particular Advertising operation method in the case that an Advertising operation is requested to a controlled device (may setup a PDU type of the Advertising Message described above).

Scanning Type: This is to define a particular scanning operation method in the case that a scanning operation is requested to a controlled device.

Supported Scanning: A characteristic representing whether the scan mode is supported Control Point: A characteristic for controlling an operation of a device Connection State: A characteristic for providing connection information to a control device by a controlled device Whitelist: This is information of devices that may be connected by a controlled device, and is extendable so as to be connected with several devices, if it is required.

Whitelist Control Point: A function for controlling Whitelist management managed by a controlled device Advertising Filter Policy: Definition for using Whitelist in the Link Layer of an Advertiser Scanning Filter Policy: Definition for using Whitelist in the Link Layer of a scanner Initiator Filter Policy: Definition for using Whitelist in the Link Layer of an indicator Connected Service Type: Communication technique scheme (e.g., Wi-Fi, Ethernet, Bluetooth BR/EDR, Bluetooth LE, etc.) and service type (including an application) supported by a device FIG. 29 shows an example of the Device State of the characteristic shown in FIG. 28. The type of the Device State may be divided into Current Device States representing a state of a current device and Operated Device States representing a state of an operable device as shown in FIG. 28(a), which may be distinguished through the Mode shown in FIG. 28(b). For example, the Mode of '0' value may represent the Current Device State and the Mode of '1' value may represent the Operated Device State.

In this case, when the mode represents the Current Device State only, only one type of state information representing the state of a current device may be provided, and when the mode represents the Operated Device State only, several types of state information may be provided in which the current device may be operable.

For example, only in the case that the mode represents the Current Device State, only one bit may be usable among the bits representing the device state shown in FIG. 29(b) (a value of the specific bit representing the state may become '1'), and in the case that the mode represents the Operated Device State, several bits may be used (a plurality of bit values may become '1').

The Remote Mode Control bit in FIG. 29(b) is a bit representing whether it is available to control the mode of the controlled device, and when the bit is '1', it represents that it is controllable, and when the bit is '0', it represents that it is uncontrollable.

Mode Change bit is a bit representing whether it is available to change a mode, when the bit is '1', it represents that it is changeable, and when the bit is '0', it represents that it is unchangeable.

FIG. 30(a) shows a particular format of the 'Advertising Type' of FIG. 27, and FIG. 30(b) shows a particular format of the 'Scanning Type' of FIG. 27.

In the case that a controlled device operates an Advertising operation, the control device may setup a type of the transmitted Advertising Message through FIG. 30(a). In the case that a controlled device operates an Scanning operation, it may be configured whether the control device performs the Passive Scanning or the Active Scanning through FIG. 30(b).

FIG. 31 shows an example of the Control Point of the characteristic shown in FIG. 28, and the control device may control device by indicating a specific operation to a device through the Control Point characteristic.

Each operation of 'Device Status Control Point' characteristic shown in FIG. 30 may be defined as follows.

Execute: Provide the states defined in the Device States to a device (a plurality of states functions is may be provided)

Advertising Start: When the Advertising operation is not performed, start the corresponding operation (Start the corresponding function immediately and/or available to be activated when the corresponding state is inactivated)

Advertising Stop: When the Advertising operation is performed, stop the corresponding operation (Stop the corresponding function immediately and/or available to be inactivated when the corresponding state is activated)

Scanning Start: When the Scanning operation is not performed, start the corresponding operation (Start the corresponding function immediately and/or available to be activated when the corresponding state is inactivated)

Scanning Stop: When the Advertising operation is performed, stop the corresponding operation (Stop the corresponding function immediately and/or available to be inactivated when the corresponding state is activated)

Initiating Request: Setup a connection with a peer device

Initiating Stop: Terminate a connection with a peer device

Refresh Bonding: Renew the bonding information (or may delete the bonding information)

Refresh Security: Redo the security procedure between two devices (authentication, authorization, encryption) and renew the information (key value for each security procedure)

Non-discoverable Mode: A mode in which a device is not discovered, stop the Advertising in the case of the Bluetooth LE, and do not perform the Inquiry Scan in the case of the Bluetooth BR/EDR Discoverable Mode: A mode in which a device is to be discovered, perform the Advertising in the case of the Bluetooth LE, and perform the Inquiry Scan in the case of the Bluetooth BR/EDR Immediate Advertising: Perform the Advertisement of the Bluetooth LE immediately Limited discoverable Mode: A device may be in the discoverable mode only in a specific condition. For example, the device may be in the discoverable mode only in a specific time, and it is available to respond to a limited inquiry (inquiry using the LIAC) in the case of the Bluetooth BR/EDR.

General discoverable mode: A device is in the discoverable mode persistently. It is available to respond to a general inquiry (inquiry using the GIAC) in the case of the Bluetooth BR/EDR.

The characteristic of the Control Point may be used in FIGS. 16, 18 and the embodiment below.

FIG. 32 is a diagram illustrating another example of a method for controlling and connecting other devices through the Bluetooth Low Energy (LE) by a control device to which the present invention may be applied.

Referring to FIG. 32 above, the control device may control the first device and the second device such that only one of the devices having a specific condition during a predetermined time is allowed to perform the Bluetooth LE connection.

Particularly, the control device 500 performs the Bonding procedure with the first device 300 and the second device 400 (step, S32010).

The bonding procedure may be performed during the process of performing the pairing procedure, and may be performed to establish a reliable relationship.

Through the bonding procedure, the control device 500 exchanges and stores the bonding information with the first device 300 and the second device 400.

The bonding information may include security information (e.g., Link key) and identification information (e.g., BD_ADDR).

In addition, while the control device is paired with the first device 300 or the second device 400 for bonding, the control device may setup time information representing a time when a connection is allowed only for the bonded device described with reference to FIG. 28 above, that is, TimerToBondedDevice characteristic.

After the bonding procedure, after the pairing between the control device 500 with the first device 300 and the second device 400 is completed, the control device 500 transmits an advertising message (a first advertising message) to the first device 300 and the second device 400 (step, S32020).

The PDU Type of the advertising message is "ADV_Direct_IND" of Table 1, which is for transmitting the advertising message to the first device 300 and the second device 400 only.

The advertising message may also be referred to as an advertising Pack Data Unit (PDU), an advertising packet, an advertisement, an advertising frame, an advertising physical channel PDU, and so on.

The first advertising message, as described in FIG. 12, includes the first control information for controlling the operation of devices.

In addition, in the bonding procedure, in the case that the control device 500 does not setup the TimerToBondedDevice characteristic of the first device 300 and/or the second device 400, the control device 500 may control the first device 300 and the second device 400 to be searched only by devices that are bonded through the advertising message.

For example, only the devices in which the bonding information is stored may include the time information representing a time when a discovery or a connection of the first device 300 and the second device 400 is allowed in the first control information.

The first device 300 and the second device 400 that receive the first advertising message, enter an undiscoverable mode and an un-connectable mode in order not to allow other devices to search or connect during the time.

However, even though the first device 300 and the second device 400 are in the undiscoverable mode and the unconnectable mode, the devices in which bonding information is stored, are allowed to search and connect to them.

That is, in case of the Bluetooth LE, the first device 300 and the second device 400 transmit the advertising message to the devices in which bonding information is stored but may not transmit the advertising message to the remaining devices.

After the time, the first device 300 and the second device 400 may enter the discoverable mode, the connectable mode and the bondable mode.

Later, the first device 300 and the second device 400 transmit an advertising message only to the devices in which bonding information is stored (step, S32030).

The advertising message may include the mode information indicating that the device mode is the connectable mode and the state information indicating that the device state is not paired, and connected.

The control device transmits a connection request message to the first device 300 and the second device 400 in order to establish a Bluetooth LE connection with the first device 300 or the second device 400 (step, S32040).

In addition, another control device 700 may transmit a connection request message in order to establish a Bluetooth LE connection with the second device 400 (step, S32050).

However, since another control device 700 is not the device that is bonded to the second device 400, that is, the bonding information is not stored in the second device 400, the second device 400 ignores the connection request message transmitted from another control device 700.

After that, steps S32060 to S32130 are omitted since the steps are the same as steps S16040 to S16110.

FIG. 33 is a diagram illustrating another example of a method for controlling and connecting other devices through the Bluetooth Low Energy (LE) by a control device to which the present invention may be applied.

Referring to FIG. 33 above, the control device may control the first device and the second device such that only one of the devices having a specific condition during a predetermined time is allowed to perform the Bluetooth LE connection.

Step S33010 is the same as step S32010 of FIG. 32 and the description will be omitted.

While the control device is paired with the first device 300 or the second device 400 for bonding, the control device may setup time information representing a time when a connection is allowed only for the bonded device described with reference to FIG. 28 above, that is, TimerToBondedDevice characteristic.

After the bonding procedure, after the pairing between the control device 500 with the first device 300 and the second device 400 is completed, the control device 500 transmits an advertising message (a first advertising message) to the first device 300 and the second device 400 (step, S32020).

The PDU Type of the advertising message is "ADV_Direct_IND" of Table 1, which is for transmitting the advertising message to the first device 300 and the second device 400 only.

The advertising message may also be referred to as an advertising Pack Data Unit (PDU), an advertising packet, an advertisement, an advertising frame, an advertising physical channel PDU, and so on.

The first advertising message, as described in FIG. 12, includes the control information for controlling the operation of devices.

In addition, in the bonding procedure, in the case that the control device 500 does not setup the TimerToBondedDevice characteristic of the first device 300 and/or the second device 400, the control device 500 may control the first device 300 and the second device 400 to be searched only by devices that are bonded through the advertising message.

For example, only the devices in which bonding information is stored may include the time information representing a time when a discovery or a connection of the first device 300 and the second device 400 is allowed in the first control information.

The first device 300 and the second device 400 that receive the first advertising message, enter an undiscoverable mode and an un-connectable mode in order not to allow other devices to search or connect during the time.

However, even though the first device 300 and the second device 400 are in the undiscoverable mode and the un-connectable mode, the devices in which bonding information is stored, are allowed to search and connect to them.

That is, during the time, the first device 300 and the second device 400 may transmit the advertising message only to the devices in which the bonding information is stored or may respond to the inquiry message transmitted from the device in which the bonding information is stored.

After the time, the first device 300 and the second device 400 may enter the discoverable mode, the connectable mode and the bondable mode.

Even in the case that the first device 300 and the second device 400 are in the undiscoverable mode during the time, the first device 300 and the second device 400 may transmit an advertising message (a second advertising message) in order for control device 500 in which the bonding information is stored to search their own devices (step, S33030).

In this case, the PDU type of the second advertising message is "ADV_Direct_IND" in Table 1.

During the time, even in the case that an inquiry message is transmitted from another control device 700 in which the bonding information is not stored, the second device 400 does not respond to the inquiry message (step, S33040).

The control device 500 that receives the second advertising message from the first device 300 and the second device 400 may search the first device 300 and the second device 400 through the Bluetooth LE.

The control device 500 that searches the devices through the advertising message transmitted from the first device 300 and the second device 400 transmits an Inquiry Message to the first device 300 and the second device 400 in order to obtain the information in relation to the Bluetooth BR/EDR state of the first device 300 and the second device 400 (step, S33050).

The first device 300 and the second device 400 that receive the inquiry message transmit an inquiry response message in response (step, S33060).

The inquiry response message may include maximum connection information that represents the number of maximum connectable devices.

In this case, the first device 300 and the second device 400 may transmit an EIR message that includes a mode and/or state information of their own Bluetooth BR/EDR additionally to the control device 500.

The state information may include the mode information representing that a mode of the device is in the Connectable mode and the state information representing that a state of the device is not paired, connected.

Hereinafter, since steps S33070 to S33150 are the same as steps S18050 to S18130, the description will be omitted.

FIG. 34 is a diagram illustrating an example of a method for a control device to control other devices through a gateway to which the present invention may be applied.

Referring to FIG. 34, the control device may transmit a control message for controlling devices to a gateway, and the gateway may control the devices by transmitting the control message received.

Particularly, the control device 500 may search a gateway 600, and through the gateway 600, may identify whether neighboring devices (the first device 300 and the second device 400) support the function of changing a mode.

The Security Connection function may be supported between the control device 500 and the gateway, and the gateway 600 may support the function such as reservation pairing, Authentication, Encryption, Privacy, Sign Data, and so on.

The control device 500 and the gateway 600 may be connected through the network technique such as Wi-Fi, LTE, and the like for a remote communication as well as the Bluetooth LE and BR/EDR.

The control device 500 transmits a request message including first control information for changing a mode of the first device 300 and the second device 400 (step, S34010).

The control information may include the Control Type field and the Control Value field as described above.

The request message may be transmitted after the control device 500 is connected with the gateway 600, but even in the case that the control device 500 is not connected with the gateway 600, the request message may be transmitted in a form of an advertising message of the Bluetooth LE.

Later, the gateway 600 transmits the control information to the first device 300 and the second device 400 through the advertising message (step, S34020).

Hereinafter, it is assumed and described that the control information includes the information for changing the first device 300 and the second device 400 to a discoverable mode, that is, in the case of the Bluetooth LE, to an advertising mode.

The first device 300 and the second device 400 that receive the advertising message enter the discoverable mode, that is, the advertising mode, and transmit the advertising message to the gateway 600 (step, S34030).

The gateway 600 that discovers the first device 300 and the second device 400 through step S34030 may be connected with the first device 300 or the second device 400 (step, S34040).

Through such a method, the control device may control devices through the gateway even in the case that the control device is long distance away from the devices.

FIG. 35 is a flowchart illustrating an example for a control device to control other devices through a gateway to which the present invention may be applied.

Referring to FIG. 35, as described with reference to FIG. 34, the control device may transmit a control message for controlling devices to a gateway, and the gateway may control the devices by transmitting the control information included in the control message received.

The control device 500 and the gateway 600 may be connected through the network technique such as Wi-Fi, LTE, and the like for a remote communication as well as the Bluetooth LE and BR/EDR.

The control device 500 transmits a request message including first control information for changing a mode of the first device 300 and the second device 400 (step, S35010).

The control information may include the Control Type field and the Control Value field as described above.

The request message may be transmitted after the control device 500 is connected with the gateway 600, but even in the case that the control device 500 is not connected with the gateway 600, the request message may be transmitted in a form of an advertising message of the Bluetooth LE.

The gateway 600 that receives the first control information through the request message transmits an advertising message (a first advertising message) in order to notify its own presence to other devices (step, S35020).

The advertising message may be unicasted, multicasted or broadcasted depending on the type of a PDU, and may be represented as an advertising Packet Data Unit (PDU), an advertising packet, an advertisement, an advertising frame, an advertising physical channel PDU, and so on.

The first advertising message includes the first control information for controlling operations of the devices.

Hereinafter, the case that the Control type of the first control information is the discovery mode change and the Control Value is the discoverable mode will be described, for example.

The first device 300 and the second device 400 that receives the first advertising message change their modes to the discoverable mode such that neighboring devices may search their own devices through the Bluetooth LE. In this case, the discoverable mode may be the advertising mode.

The first device 300 and the second device 400 changed to the discoverable mode transmit an advertising message (a second advertising message) such that the gateway 600 may search their own devices (step, S35030).

The gateway 600 that receives the second advertising message from the first device 300 and the second device 400 may search the first device 300 and the second device 400 through the Bluetooth LE.

The gateway 600 that searches the first device 300 and the second device 400 transmits a list of the searched devices to the control device 500 (step, S35040).

Later, the control device 500 transmits a connection request message to the gateway 600 in order to control the first device 300 and the second device 400 to establish a Bluetooth BR/EDR or a Bluetooth LE connection (step, S35050).

In order to establish the Bluetooth LE connection with the first device 300 or the second device 400, the gateway 600 may transmit the connection request message to the first device 300 or the second device 400 (step, S35060).

Later, the gateway 600 may establish the Bluetooth LE connection by performing a connection procedure with the first device 300 or the second device 400 (step, S35070).

The gateway 600, and the first device 300 or the second device 400 that are connected through the Bluetooth LE perform through an Authentication Procedure, an Authorization Procedure and an Encryption Procedure according to a security mode (step, S35080).

The gateway 600 may transmit a write request message including the second control information to the first device 300 or the second device 400 in order for the control device 500 to control the first device 300 or the second device 400 through the second control information.

For example, the first device 300 transmits the write request message that requests to write in a control point included in the Characteristic which is described with reference to FIG. 28 to FIG. 31 (step, S35090).

Hereinafter, the case of indicating a connection with the second device 400 or the first device 300 through the Control Point will be described as an example.

The first device 300 or the second device 400 that receives the write request from the gateway 600 establishes a Bluetooth LE connection through the connection procedure (step, S35100).

Later, the first device 300 and the second device 400 perform through an Authentication Procedure, an Authorization Procedure and an Encryption Procedure according to a service that is going to provide or a security mode of a device (step, S35110).

The first device 300 or the second device 400 may notify that the Bluetooth LE connection is established to the gateway 600 through a connection notification message (step, S35120).

The gateway 600 transmits a connection terminate message that indicates a connection termination to the first device 300 or the second device 400 directly or by receives the connection termination message that indicates a connection termination from the control device 500 (step, S35130).

The first device 300 or the second device 400 that receives the connection terminate message terminates the connection with the second device 400 or the first device 300 (step, S35140).

FIGS. 36 to 38 are diagrams illustrating another example of a method for a control device to control and connect other devices to which the present invention may be applied.

Referring to FIG. 36, the control device 500 controls a dual mode device that supports the Bluetooth BR/EDR and the Bluetooth LE or the first device 300 that supports the Bluetooth LE only such that the first device 300 establishes a Bluetooth LE connection with the second device 400 that supports the Bluetooth LE only.

In this case, the control device 500 may change the mode of the first device 300 to the discovery mode in which the discovery is available (an inquiry scan mode for the Bluetooth BR/EDR and an advertising mode for the Bluetooth LE), and may establish a Bluetooth BR/EDR connection or a Bluetooth LE connection with the first device 300 (step, S36010).

In this case, the advertising message that the first device 300 transmits to the control device 500 for the discovery may include role information of the first device 300, an ID of a pairing device, a type of supportable wireless interface, security mode information and maximum connection information that represents the maximum number of connectable devices.

In the case that the first device 300 is in a dual mode, it may be configured such that the Bluetooth LE is preferentially connected.

In addition, the first device 300 may enter a scan mode periodically in order to receive the advertising message transmitted from the control device 500.

The first device 300 may limit the authority that the control device 500 controls according to an access authority of the control device.

That is, according to the access authority, the range for controlling the first device 300 may be changed.

FIG. 38 shows an example of the range that the control device may control according to authority.

The authority shown in FIG. 38 may be given to the control device 500 after the first device 300 performs a security procedure (e.g., Secure Simple Pairing) with the control device 500.

In this case, different passwords may be used for each authority.

FIG. 37 shows an example of a method for the control device to control the first device to be connected with a plurality of devices.

Referring to FIG. 37, the control device 500 may establish a Bluetooth LE connection with the first device 300, and may control the first device 300 to be connected with a plurality of devices by transmitting a control message to the first device 300.

For example, after the control device 500 is connected with the first device 300 through the Bluetooth LE (step, S37010), and may transmit a control message to the first device 300 so as to perform a connection with the second device 400 and the third device 900 (steps, S37020 and S37030).

In this case, as described above, the first device may configure control authorization shown in FIG. 37 to the control device 500.

According to the authorization configured, the control device 500 may control connections with both of the second device 400 and the third device 900 or may control a connection with either one of the second device 400 and the third device 900.

The present invention described so far is not limited by the embodiments described above and the accompanying drawings since various substitutions, modifications and alterations of the present invention are available for those skilled in the art without departing from the inventive concept of the present invention.

The invention claimed is:

1. A method for controlling a connection between a first device and a second device using Bluetooth performed by a control device, the method comprising:
   transmitting to at least one of the first device or the second device a first advertising message including first control information for controlling a mode of the at least one device;
   receiving a second advertising message for searching the at least one device from the at least one device;
   performing a connection with the at least one device;
   transmitting a write request message including second control information indicating a connection with the second device to the first device; and
   receiving a write response message in response to the write request message,
   wherein the control information comprises at least one of a control type field indicating a control type or a data field including detailed control data according to the control type,
   wherein the second control information further includes time information indicating a time when a connection is allowed for a bonded device only, and
   wherein the first device is in an undiscoverable mode during the time when the connection is allowed for the bonded device only.

2. The method of claim 1, wherein the first advertising message includes at least one of an address, information or a function of another control device.

3. The method of claim 1, wherein the control type field includes at least one of role change information for controlling a role change of a device, discovery mode change information for controlling a change of a discovery mode, connection mode change information for controlling a change of a connection mode or security mode change information for controlling a change of a security mode.

4. The method of claim 3, wherein the data field includes at least one of indiscoverable mode information indicating an indiscoverable mode, limited discovery mode information indicating a limited discovery mode or normal discovery mode information indicating a normal discovery mode, when the control type field includes the discovery mode change information.

5. The method of claim 3, wherein the data field includes at least one of un-connectable mode information indicating an un-connectable mode or connectable mode information indicating a connectable mode, when the control type field includes the connection mode change information.

6. The method of claim 3, wherein the data field includes at least one of authentication information indicating that an authentication is available or authority configuration information indicating that an authority configuration is available, when the control type field includes the security mode change information.

7. The method of claim 1, wherein the first advertising message includes at least one of first device information indicating the first device or second device information indicating the second device.

8. The method of claim 7, wherein the information included in the control type field corresponds to the first device information or the second device information.

9. The method of claim 1, wherein the second control information includes indication information indicating a change of a discovery mode of the first device.

10. The method of claim 9, wherein the indication information indicates one of an undiscoverable mode, a limited discovery mode or a normal discovery mode.

11. The method of claim 1, wherein the write request message further includes information of the second device.

12. The method of claim 1, further comprising:
   receiving a notification message indicating that the first device is connected with the second device from the first device.

13. The method of claim 12, further comprising:
   receiving a connection termination message indicating that a connection is terminated from the first device, when a connection with the second device is terminated.

14. The method of claim 1, wherein the control device and the first device are connected through Bluetooth Low Energy (LE).

15. A control device for controlling a connection between a first device and a second device using Bluetooth, the control device comprising:
   a transceiver; and
   a processor functionally connected with the communication unit,
   wherein the processor is configured to:
      control the transceiver to transmit to at least one of the first device or the second device a first advertising message including first control information for controlling a mode of the at least one device,
      control the transceiver to receive a second advertising message for searching the at least one device from the at least one device,
      perform a connection with the at least one device,
      control the transceiver to transmit a write request message including second control information indicating a connection with the second device to the first device, and
      control the transceiver to receive a write response message in response to the write request message,
   wherein the control information comprises at least one of a control type field indicating a control type or a data field including detailed control data according to the control type,
   wherein the second control information further includes time information indicating a time when a connection is allowed for a bonded device only, and
   wherein the first device is in an undiscoverable mode during the time when the connection is allowed for the bonded device only.

* * * * *